(12) United States Patent
Doughty et al.

(10) Patent No.: US 12,433,249 B2
(45) Date of Patent: Oct. 7, 2025

(54) HOME PET SYSTEMS AND DEVICES

(71) Applicant: iRobot Corporation, Bedford, MA (US)

(72) Inventors: Brian W. Doughty, Framingham, MA (US); Vincent Edward Colella, Wilmington, MA (US); Elizabeth Victoria Luyster, Louisville, KY (US)

(73) Assignee: iRobot Corporation, Bedford, MA (US)

( * ) Notice: Subject to any disclaimer, the term of this patent is extended or adjusted under 35 U.S.C. 154(b) by 243 days.

(21) Appl. No.: 18/080,245

(22) Filed: Dec. 13, 2022

(65) Prior Publication Data

US 2024/0188535 A1 Jun. 13, 2024

(51) Int. Cl.
  *A01K 5/02* (2006.01)
  *A01K 1/015* (2006.01)
  *A01K 1/035* (2006.01)
  *A01K 5/01* (2006.01)

(52) U.S. Cl.
  CPC .......... *A01K 5/0291* (2013.01); *A01K 1/0158* (2013.01); *A01K 1/035* (2013.01); *A01K 5/0114* (2013.01)

(58) Field of Classification Search
  CPC .. A01K 5/0291; A01K 5/0114; A01K 5/0275; A01K 5/02; A01K 5/0283; A01K 5/025; A01K 5/0142; A01K 5/0216; A01K 1/0158; A01K 1/0107; A01K 7/02; A01K 7/027; A01K 7/00; A01K 7/025; A01K 11/006; A01K 39/02

USPC .......... 119/51.11, 51.5, 57.1, 51.02; 222/650
See application file for complete search history.

(56) References Cited

U.S. PATENT DOCUMENTS

| | | | | |
|---|---|---|---|---|
| 3,450,101 | A | * 6/1969 | Avrea | A01K 5/0291 222/650 |
| 3,670,923 | A | * 6/1972 | Hawes, Jr. | G05D 11/136 222/2 |
| 6,062,166 | A | * 5/2000 | Macrina | A01K 7/02 119/51.11 |
| 6,367,417 | B1 | * 4/2002 | Gal | A01K 5/0283 119/51.5 |
| 6,863,025 | B2 | * 3/2005 | Ness | A01K 5/0114 119/51.5 |
| 8,113,148 | B2 | 2/2012 | Chern | |
| 8,220,413 | B2 | 7/2012 | Laro | |
| 8,596,219 | B1 | 12/2013 | Miller | |

(Continued)

FOREIGN PATENT DOCUMENTS

EP 3402323 6/2021

*Primary Examiner* — Zoe Tam Tran
(74) *Attorney, Agent, or Firm* — Schwegman Lundberg & Woessner, P.A.

(57) ABSTRACT

A pet feeding system can include a housing, a food tray connected to the housing, and a liquid tray connected to the housing. The pet feeding system can include a food dispenser connected to the housing and configured to dispense food into the food tray. The pet feeding system can include a liquid dispenser connected to the housing and configured to dispense liquid into the liquid tray. The pet feeding system can include a controller communicatively connected to the food dispenser and the liquid dispenser. The controller can operate the food dispenser to dispense the food into the food tray and can operate the liquid dispenser to dispense liquid into the liquid tray.

8 Claims, 16 Drawing Sheets

(56) References Cited

U.S. PATENT DOCUMENTS

| | | | | |
|---|---|---|---|---|
| 8,997,690 B2* | 4/2015 | Jones | ................... | A01K 5/0291 |
| | | | | 222/650 |
| 9,192,142 B2 | 11/2015 | Jackson et al. | | |
| 9,232,769 B1 | 1/2016 | Wolf et al. | | |
| 9,711,036 B2 | 7/2017 | Fadell et al. | | |
| 9,795,115 B2* | 10/2017 | Ausman | ................. | A01K 5/025 |
| 10,091,972 B1* | 10/2018 | Jensen | ..................... | A01K 7/02 |
| 10,208,975 B2 | 2/2019 | Azevedo et al. | | |
| 10,352,759 B1* | 7/2019 | Jensen | ................... | A47G 23/12 |
| 10,398,127 B2 | 9/2019 | Hu et al. | | |
| 10,568,301 B2 | 2/2020 | Chen | | |
| 11,083,169 B2 | 8/2021 | Mundell et al. | | |
| 11,160,253 B2 | 11/2021 | Mundell et al. | | |
| 2006/0196433 A1* | 9/2006 | Ness | ................... | A01K 5/0114 |
| | | | | 119/52.1 |
| 2015/0181840 A1 | 7/2015 | Tupin, Jr. et al. | | |
| 2016/0000036 A1* | 1/2016 | Cornwell, Jr. | ....... | A01K 5/0291 |
| | | | | 119/51.11 |
| 2016/0286755 A1 | 10/2016 | Feng | | |
| 2017/0150698 A1* | 6/2017 | Zaidi | .................... | A01K 5/0225 |
| 2020/0037577 A1* | 2/2020 | Dzamba | ................. | A01K 5/025 |
| 2021/0127630 A1* | 5/2021 | Zimmerman | ......... | A61B 5/1118 |
| 2021/0195873 A1* | 7/2021 | Rho | ......................... | A01K 7/02 |
| 2022/0312727 A1* | 10/2022 | Zhang | ................ | A01K 5/0225 |

\* cited by examiner

HOME PET SYSTEMS AND DEVICES

BACKGROUND

Pet owners often have many specialized devices and accessories for the pets. Owners use leashes for walking their pets, specialty bowls for feeding pets, beds for their pets to sleep in, and more. A growing trend is to include technology in some of these devices. For example, many pet owners use microchips for identifying their pets and some use smart collars for locating their pets and for tracking their activities throughout the day.

SUMMARY

Smart pet devices can be useful for helping to care for pets such as by automatically feeding a pet by dispensing food at a given time. However, such devices are limited in flexibility of dispensing and in capabilities of tracking dispensing and pet interaction with the food. This disclosure describes devices and methods that can help to address this problem such as by including a pet food and liquid dispenser that can dispense not only food but water. The device or system can also include one or more sensors to help determine whether food was dispensed, consumed, and a rate of uptake. Liquid uptake can be similarly monitored. The system can also include one or more identification sensors, such as an image capture device or wireless identification system for identifying pets (and optionally people) to help more accurately track consumption.

For example, a pet feeding system can include a housing, a food tray connected to the housing, and a liquid tray connected to the housing. The pet feeding system can include a food dispenser connected to the housing and configured to dispense food into the food tray. The pet feeding system can include a liquid dispenser connected to the housing and configured to dispense liquid into the liquid tray. The pet feeding system can include a controller communicatively connected to the food dispenser and the liquid dispenser. The controller can operate the food dispenser to dispense the food into the food tray and can operate the liquid dispenser to dispense liquid into the liquid tray.

Another common device used by pet owners are pet beds and crates, which can be used by pets for sleeping and can be used by owners for training. However, most pet peds and crates are limited in flexibility and provide little to no feedback about the pet. This disclosure describes devices and methods that can help to address this problem such as by including a pet crate or bed that is adjustable in size so that it can grow as the pet grows and can be condensed easily for storage and for reducing floor space when not in use. The crate or bed can also include one or more sensors for tracking a weight or mass of the pet to help determine pet health and to help guide pet feeding. The crate or bed can also include one or more identification sensors, such as an image capture device or wireless identification system for identifying pets (and optionally people).

For example, a pet bed system can include a cushion and a frame engageable with a floor surface and configured to support the cushion at least partially above the floor surface. The pet bed system can include a sensor connected to the frame, where the sensor can produce a sensor signal based on a condition of the cushion and the frame. The pet bed system can include a controller communicatively configured to produce an alert based on the sensor signal.

The above discussion is intended to provide an overview of subject matter of the present patent application. It is not intended to provide an exclusive or exhaustive explanation of the invention. The description below is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
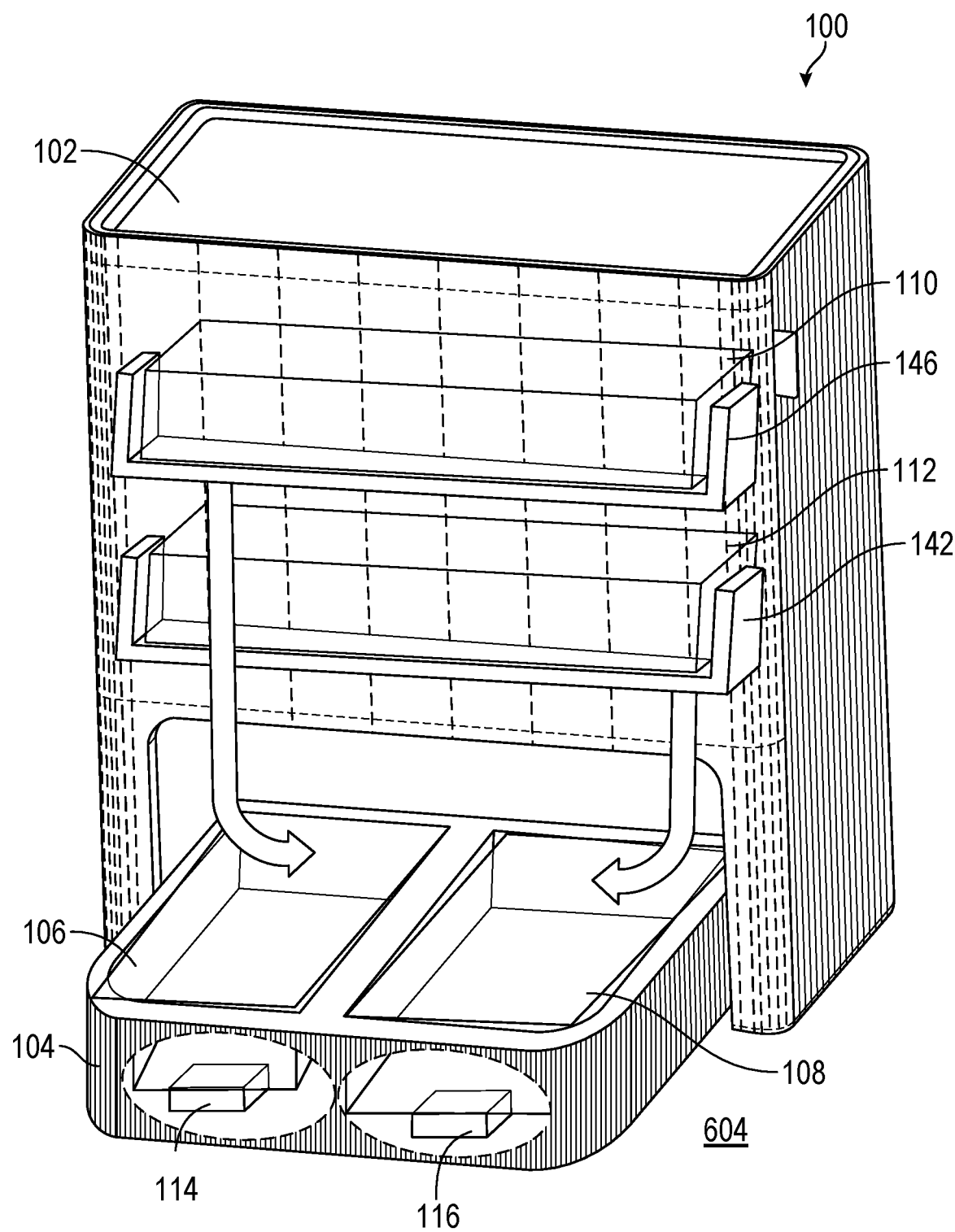
FIG. 1 illustrates an isometric view of a pet feeding system.

FIG. 1 illustrates an isometric view of a pet feeding system 100. The pet feeding system 100 can be a system for automatically feeding a pet or for automatically delivering potable fluids or liquids to the pet, as well as receiving feedback about activities of the pet, as discussed in further detail below.

The pet feeding system 100 can include a housing 102 configured to house and support one or more components of the pet feeding system 100 on a floor surface or other surface. The housing 102 can include or can define a tray assembly 104 extending from a bottom portion of the housing 102. The tray assembly 104 can be configured to support one or more trays or sensors therein. For example, the pet feeding system 100 can include a food tray 106 located at least partially within the tray assembly 104 and a liquid tray 108 located at least partially within the tray assembly 104. Each of the food tray 106 and the liquid tray 108 can be containers with an open top configured to receive solid or liquid therein and configured to be accessible for retrieval of the solids or liquids therefrom. Optionally, the food tray 106 or the liquid tray 108 can be user-removable (including end-user removable) from the tray assembly 104, such as for cleaning of the tray assembly 104 or to change to a new tray for a different pet.

The pet feeding system 100 can also include a food hopper 110 located at least partially within the housing 102 and connected thereto. The food hopper 110 can optionally be user-removable (including end-user removable) from the housing 102. The food hopper 110 can be configured to receive and retain food or solids therein and can be operable to dispense food or solids into the food tray 106. Similarly, the pet feeding system 100 can include a liquid hopper 112 located at least partially within the housing 102 and connected thereto. The liquid hopper 112 can optionally be user-removable (including end-user removable) from the housing 102. The liquid hopper 112 can be configured to receive and retain liquids, such as water, therein, and the liquid hopper 112 can be operable to dispense liquid into the liquid tray 108.

The pet feeding system 100 can also include a controller connected (such as communicatively connected) to a food dispenser and a liquid dispenser, as discussed in further detail below, such that the controller can be configured to operate the food dispenser to dispense the food into the food tray and can be configured to operate the liquid dispenser to dispense liquid into the liquid tray.

The pet feeding system 100 can also include a food sensor 114 that can be connected to the food tray 106. The food sensor 114 can be configured to produce a food sensor signal based on a condition of the food tray 106 and the controller can be configured to operate the food dispenser based on the food sensor signal. For example, the food sensor can be a force sensor and the controller can be configured to determine a weight of food within the food tray 106 and can dispense food based on the determined weight.

The food hopper 110 can be located relative to a food hooper sensor 146 that can be configured to produce a food signal based on the condition of the food hopper 110 and the controller can be configured to operate the food dispenser based on the food hopper sensor signal 146. The controller can be configured to monitor the food sensor 114 and the food hopper sensor 146 to provide a robust system for controlled delivery of food to the food tray 106. The controller can also generate or transmit a signal to the user when the food sensor 114 detects an object added to the food tray 106 that was not delivered from the food hopper 110, such as measured by the food hopper sensor 146.

Similarly, the pet feeding system 100 can also include a liquid sensor 116 that can be connected to the liquid tray 108. The liquid sensor 116 can be configured to produce a liquid sensor signal based on a condition of the liquid tray 108 and the controller can be configured to operate the liquid dispenser based on the liquid sensor signal. For example, the liquid sensor 116 can be a force sensor and the controller can be configured to determine a weight of liquid (which can be used to determine a volume of liquid) within the liquid tray 108 and can dispense liquid based on the determined weight.

The liquid hopper 112 can be positioned relative to a load cell 142 that can be configured to produce a liquid signal based on the condition of the liquid hopper 112 and the controller can be configured to operate the liquid dispenser based on a liquid hopper sensor signal from the load cell 142. The controller can be configured to monitor both the liquid sensor 116 and the liquid hopper sensor 142 to create a robust system for the controlled delivery of liquid to the liquid tray 108. The controller can also generate a signal to the user when the liquid sensor 116 detects an object added to the liquid tray 108 that was not delivered from the liquid hopper 112 as measured by the liquid hopper sensor 142.

Figure 2A:
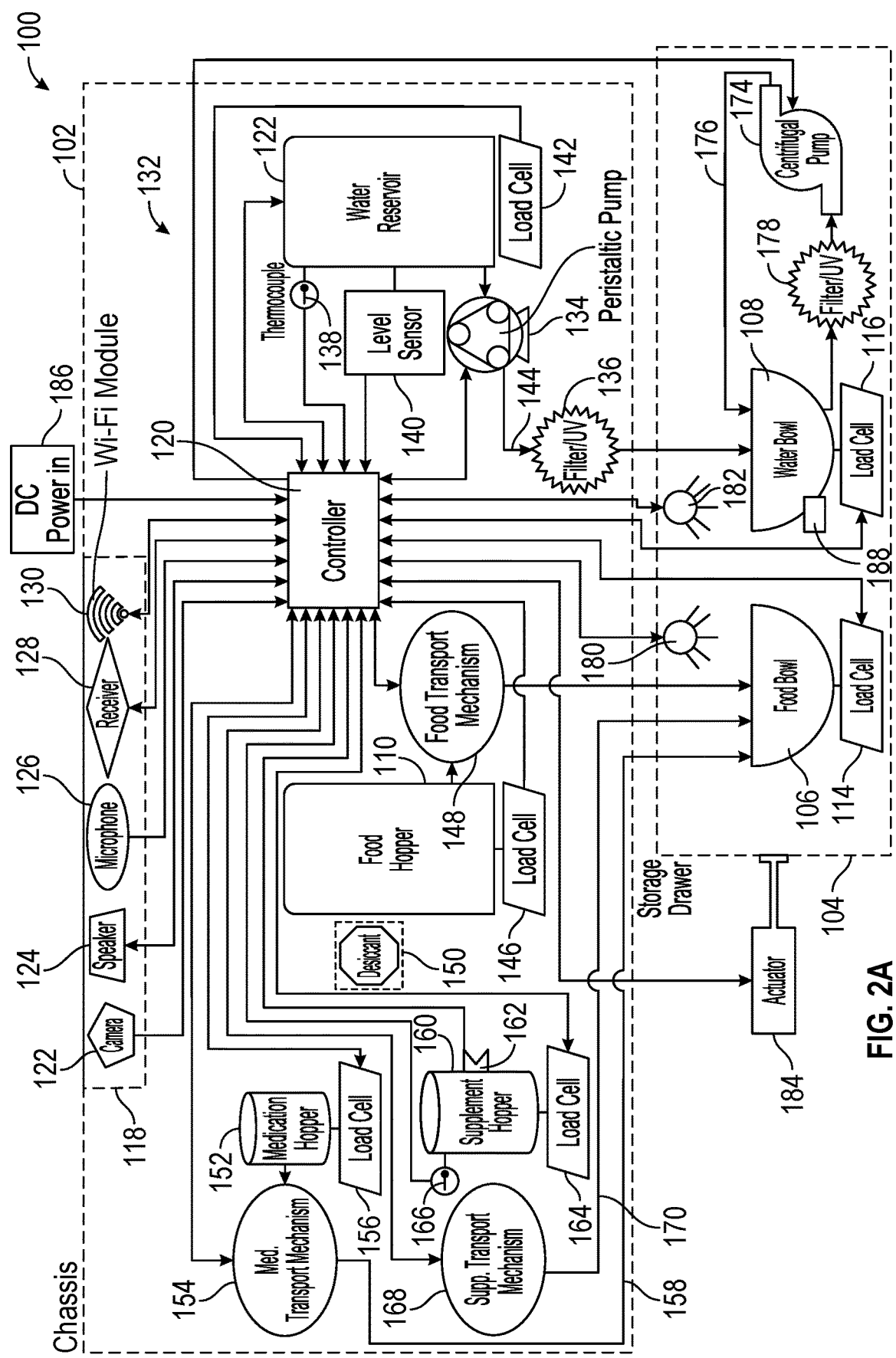
FIG. 2A illustrates a schematic view of a pet feeding system.

FIG. 2A illustrates a schematic view of the pet feeding system 100. The pet feeding system 100 can be consistent with the pet feeding system 100 of FIG. 1; FIG. 2A shows, schematically, additional components and details of the pet feeding system 100. For example, FIG. 2A shows that the pet feeding system 100 can include a sensor system 118, which can be connected to the housing 102 and can be in communication with a controller 120, where the controller 120 can also be connected to the housing 102.

The controller 120 can be a programmable controller, such as a single or multi-board computer, a direct digital controller (DDC), a programmable logic controller (PLC), or the like. In other examples the controller 120 can be any computing device, such as a handheld computer, for example, a smart phone, a tablet, a laptop, a desktop computer, or any other computing device including a processor, memory, and communication capabilities.

The sensor system 118 can include one or more sensors or systems, such as an image capture device 122 (e.g., a camera). The image capture device 122 can be connected to the housing 102 and can be configured to transmit an image capture signal to the controller 120 based on imagery of an environment of the pet feeding system 100, such as one or more pets or persons within the environment. The sensor system 118 can also include an audio sensor 126, such as a microphone. The audio sensor 126 can be connected to the housing 102 and can be configured to transmit an audio signal to the controller 120 based on one or more sounds of an environment of the pet feeding system 100.

The sensor system 118 can also include a first transceiver 128 and a second transceiver 130. The first transceiver 128 can be, for example, a low energy Bluetooth-low-energy (BLE) transceiver and the second transceiver 130 can be a Wi-Fi transceiver. Each of the first transceiver 128 and the second transceiver 130 can be other transceiver types, such as NFC, or the like. Each of the first transceiver 128 and the second transceiver 130 can be in communication with the controller 120 and can be configured to interact with one or more devices or components of the pet feeding system 100, one or more external devices, or a network (such as a network 200 of FIG. 2B discussed below).

The pet feeding system 100 can also include a liquid control system 132 that can include a pump 134, a filter 136, a temperature sensor 138, a level sensor 140, and a load cell 142. Each of the components of the liquid control system 132 can be connected to the housing 102 or located at least partially within the housing 102. Also, each of the components of the liquid control system 132 can be communicatively connected to the controller 120.

More specifically, the pump 134 can be connected to the liquid hopper 112 such as to pump fluid or liquid (e.g., water) to the liquid tray 108 through a liquid line 144. Optionally, the filter 136 can be mounted in the liquid line 144 such as downstream of the pump 134 and upstream of the liquid tray 108. The filter 136 can be configured to filter the liquid before it is delivered to the liquid tray 108. In some examples, the filter 136 can be an Ultraviolet filter.

The pump 134 can be a fluid or liquid pump, such as a positive displacement, a centrifugal pump, an axial pump, or the like. Optionally, the pump 134 can be replaced by a valve and the liquid can be delivered from the liquid hopper 112 to the liquid tray 108 using gravity. In some examples, the pump 134 can be a peristaltic pump and the controller 120 can be configured to operate the pump 134 to control a volume of water dispensed to the liquid tray 108, such as based on the signal from the liquid sensor 116.

The level sensor 140 can be a level sensor such as a float or optical level sensor. The level sensor 140 can be configured to produce a signal based on a level of fluid or liquid within the liquid hopper 112. The level sensor 140 can transmit a level signal to the controller 120 based on the liquid level within the liquid hopper 112. Similarly, the load cell 142 can transmit a signal to the controller 120 based on a force or load of the liquid hopper 112. The controller 120 can use the level signal or the load signal to determine an amount of fluid or liquid within the liquid hopper 112. The temperature sensor 138 can also be connected to the liquid hopper 112 and can transmit a temperature signal to the controller 120 based on a temperature of the fluid or liquid within the liquid hopper 112.

The pet feeding system 100 can also include a load cell 146 connected to the pet feeding system 100. The load cell 146 can transmit a signal to the controller 120 based on a force or load of the food hopper 110. The pet feeding system 100 can further include a food dispenser 148, which can be a pump or actuator operable to dispense food from the food hopper 110 into the food tray 106. The food dispenser 148 can be connected to, and in communication with, the controller 120 such that the controller 120 can operate the food dispenser 148 to dispense the food from the food hopper 110. The pet feeding system 100 can also include a desiccant container 150 that can include desiccant and can be connected to the food hopper 110, such as to absorb moisture from the food hopper 110 to help keep food within the food hopper 110 fresh or dry.

The pet feeding system 100 can also include a medication hopper 152 that can be located at least partially within the housing 102 or can be connected to the housing 102. Optionally, the medication hopper 152 can be external to the housing 102 and can be controlled by the controller 120, such as through an auxiliary connection (e.g., to provide power and control) or through a wireless connection. The medication hopper 152 can be configured to receive and store medication therein, such as for dispensing to the food tray 106 or the liquid tray 108. The medication hopper 152 can be optionally user-removable (including end-user removable) from the housing 102. A load cell 156 can be connected to the medication hopper 152 and can be in communication with the controller 120 such as to transmit a medication hopper load cell signal to the controller 120. A pump 154, which can be any type of pump, such as a positive displacement pump, can be connected to the medication hopper 152 and can be connected to a medication line 158, such as to deliver medication to the food tray 106. The pump 154 can be in communication with the controller 120 such that the controller 120 can control operation of the pump 154.

The pet feeding system 100 can also include a supplement hopper 160 that can be located at least partially within the housing 102 or can be connected to the housing 102. Optionally, the supplement hopper 160 can be external to the housing 102 and can be controlled by the controller 120, such as through an auxiliary connection (e.g., to provide power and control) or through a wireless connection. The supplement hopper 160 can be configured to receive and store one or more supplements therein (such as food flavoring or one or more medical supplements, e.g., glucosamine), such as for dispensing to the food tray 106 or the liquid tray 108. The supplement hopper 160 can be optionally user-removable (including end-user removable) from the housing 102.

A heating or cooling device 162, such as a thermo-electric cooler, can be connected to the supplement hopper 160 and can be connected to the controller 120. The heating or cooling device 162 can be operable to heat or cool the supplement hopper 160 and contents thereof. A load cell 164 can be connected to the supplement hopper 160 and can be in communication with the controller 120 to transmit a supplement hopper load cell signal to the controller 120.

A temperature sensor 166 can also be connected to the supplement hopper 160 and can transmit a temperature signal to the controller 120 based on a temperature of the supplement or wet food within the supplement hopper 166. An actuator 168, which can be any type of pump, such as a positive displacement pump, auger, or other mechanism for transporting supplements to the food tray 106, can be connected to the supplement hopper 160 and can be connected to a supplement line 170. The actuator 168 can be operable to deliver supplements to the food tray 106. The actuator 168 can be in communication with the controller 120, allowing the controller 120 to control operation of the actuator 168.

The pet feeding system 100 can also include a circulating pump 174 connected to the liquid tray 108 in a recirculation line 176. A filter 178 can also be connected to the recirculation line 176. The circulating pump 174 can be in communication with the controller 120, which can allow the controller 120 to operate the circulating pump 174 to circulate liquid within the liquid tray 108, which can optionally be filtered by the filter 178 to help clean the fluid or liquid clean.

The pet feeding system 100 can also include a food tray cleaner 180 and a liquid tray cleaner 182. The food tray cleaner 180 and the liquid tray cleaner 182 can each be connected to the controller 120 and can be operable to dispense a cleaning liquid to its respective tray.

FIG. 2A also shows that the pet feeding system 100 can include a drawer actuator 184 that can be connected to the housing 102 and the tray assembly 104. In such an example, the tray assembly 104 can be movable with respect to the housing to extend the food tray 106 and the liquid tray 108 for access thereto and can be movable to retract the food tray 106 and the liquid tray 108 to limit access thereto. The drawer actuator 184 can be in communication with the controller 120, which can operate the drawer actuator 184 to move the food tray 106 and the liquid tray 108 between the extended and the retracted positions based on one or more sensor signals. For example, the trays can be moved at a scheduled time of day, based on proximity of a pet nearby, proximity of the correct pet nearby, proximity of the incorrect pet nearby, etc.

The pet feeding system 100 can also include a power supply 186 connected to the housing 102. The power supply 186 can be connected to any of the components of the pet feeding system 100 such as to deliver power thereto.

In operation of some examples, the controller 120 can be configured to control the liquid in the liquid tray 108. For example, the controller 120 can operate the circulating pump 174 to circulate the liquid through the liquid tray 108 based on a timer or based on a load cell signal from the liquid sensor 116, such as when the controller 120 determines (based on the load cell signal from the liquid sensor 116) that liquid is in the liquid tray 108.

The controller 120 can also control the circulating pump 174 based on liquid quality. For example, the controller 120 can determine a liquid quality based on a liquid quality signal from a liquid quality sensor 188 that can be connected to the liquid tray. The controller 120 can operate the circulating pump 174 based on the liquid quality signal to help keep the liquid within the liquid tray 108 fresh.

Optionally, the controller 120 can operate the drawer actuator 184 based on the liquid quality sensor 188. For example, when the controller 120 determines that a quality of the liquid within the liquid tray 108 falls below a threshold, the drawer actuator 184 can be operated by the controller 120 to retract into the housing 102. When such a determination is made by the controller 120, the controller 120 can transmit (such as using the second transceiver 130) an alert that there is a water quality issue to a user device or network. The controller 120 can also control the pump 134 to improve water quality of the liquid. The controller 120 can also control the pump 134 to maintain a minimum liquid level in the liquid tray 108 such as based on the load cell signal from the liquid sensor 116.

In some examples, the controller 120 can operate the circulating pump 174 to remove liquid from the liquid tray 108, such as by pumping the liquid into a dirty liquid container. The controller 120 can perform such an action when the controller 120 determines that the liquid within the liquid tray 108 is dirty or bad, such as based on the liquid quality sensor 188 or based on time following dispensing of liquid into the liquid tray 108.

Similarly, the controller 120 can operate an actuator (or produce and transmit an alert) to remove food from the food tray 106. The controller 120 can perform such an action when the controller 120 determines that the food within the food tray 106 is dirty or bad, such as based on time following dispensing of food into the food tray 106.

In further operation of the pet feeding system 100, the controller 120 can determine whether a specified amount of liquid has been consumed. For example, the controller 120 can determine how much liquid has been dispensed by the pump 134 over a time period and how much liquid has been consumed (such as based on the load cell signal from the liquid sensor 116). For example, the controller 120 can be configured to determine whether 1 liter of liquid per day has been consumed. The controller 120 can transmit an alert to the user (e.g., via a user device) when the specified amount to be consumed is met or has not been met.

The controller 120 can also provide liquid into the liquid tray 108 in small increments to help reduce an amount of time that water is left sitting out. The controller 120 can also use the signal from the liquid sensor 116 to determine if a foreign object or foreign liquid has been added to the liquid tray 108. For example, the signal from the liquid sensor 116 can indicate that the weight or mass of the liquid tray 108 has increased though fluid has not been dispensed by the liquid tray cleaner 182.

The controller 120 can also monitor the liquid hopper 112. For example, the controller 120 can determine, based on a temperature signal from the temperature sensor 138, whether a temperature of the liquid within the liquid hopper 112 exceeds a threshold temperature. The controller 120 can transmit an alert when the temperature exceeds a threshold temperature or when the temperature exceeds a threshold temperature for a predetermined amount of time. The controller 120 can also produce an alert based on the load signal from the load cell 142 (or based on the level signal from the level sensor 140), such as when a volume or mass of the liquid within the liquid hopper 112 falls below a threshold level, which can be an indication that the liquid hopper 112 is empty or nearing empty and requires refilling.

The system 100 can also monitor a fluid consumption trend of the pet, such as based on an amount of fluid dispensed and based on the signal from the liquid sensor 116. The controller 120 can use this information to estimate a number of days of water remaining in the liquid hopper 112 based on the rate of consumption. Similarly, the system 100 can also monitor a food consumption trend of the pet, such as based on an amount of food dispensed and based on the signal from the food sensor 114. The controller 120 can use this information to estimate a number of days of food remaining in the food hopper 110 based on the rate of consumption. The system 100 can thereby more accurately predict when maintenance (or refilling) will be required, as consumption can vary significantly from pet to pet due to breed, size, age, activity, etc.

In operation of some examples, the controller 120 can operate the food dispenser 148 to dispense a specified volume or mass of food, or a specified amount of food over a period of time. For example, the food dispenser 148 can be operated to dispense 500 grams of food per day. In such an example, the controller 120 can determine (based on the load cell signal from the food sensor 114) when the food tray 106 can accept more food and can operate the food dispenser 148 to dispense food into the food tray 106 until the controller 120 has determined that the specified amount of food per time has been reached. The controller 120 can also monitor, such as based on the load cell signal from the food sensor 114, that the specified amount of food per time has been consumed (or has not been consumed). The controller 120 can also be configured to deliver small amounts of food over a given time period. For example, the controller 120 can be configured to deliver 500 grams of food in a given day while delivering 50 grams of food every two hours.

Optionally, the amount of food to be delivered per day can be delivered in increments, such as 125 grams per serving, which can be delivered when the controller 120 determines (based on the load cell signal from the food sensor 114) when the food in the food tray 106 has been consumed, such that each serving can be dispensed based on a schedule or based on consumption of the previous serving. The pet feeding system 100 can also deliver food optimized for pets that may consume food at too high of a rate, which can result in consumption difficulties or health or digestive issues. The system 100 can be set to deliver, for example, a serving (e.g., 125 grams) of food at a constant rate, such as at a rate of 1 gram per second. Dispensing at a reduced rate (instead of all at once) can help to ensure that the food is not eaten too quickly, such as no faster than 2 minutes in the example of 125 grams at 1 gram per minute. Dispensing can also be divided into small and less frequent servings. For example, the pet feeding system 100 can dispense 25 grams every 60 seconds for a total of 5 minutes.

The controller 120 can also be configured operate the pump 154 to dispense a specified volume or mass of medication from the medication hopper 152 over a period of time. For example, the pump 154 can be operated to dispense 2 grams of medication per day. The controller 120 can also monitor or determine, such as based on the load cell signal from the food sensor 114, whether the medication has been consumed and the controller 120 can produce an alert to indicate whether or not the medication has been consumed. The controller 120 can optionally be configured to dispense the medication when the controller 120 determines that there is food in the food tray 106 (or that there is not food in the tray), such as based on the signal from the food sensor 114.

The controller 120 can also operate the actuator 168 to dispense a specified volume or mass of supplement from the supplement hopper 160 over a period of time. For example, the actuator 168 can be operated to dispense 10 grams of supplement per day. The controller 120 can optionally be configured to dispense the supplement when the controller 120 determines that there is food in the food tray 106, such as based on the signal from the food sensor 114. Or, the controller 120 can be configured to dispense the supplement after the controller 120 operates the food dispenser 148 to dispense food into the food tray 106. The meal supplement can be in support of added nutrition, vitamins, or a topper to encourage pets to eat the food.

The pet feeding system 100 can also be configured to operate one or more components of the pet feeding system 100 based on identification of a pet or other individual. For example, the pet feeding system 100 can use the image capture device 122, the audio sensor 126, the first transceiver 128, or the second transceiver 130 to identify a pet or individual near the pet feeding system 100. For example, the image signal from the image capture device 122 can be used by the controller 120 to identify a pet, such as in the case of multi-pet homes. Also, the first transceiver 128 can be used to identify a pet such as using an identifying tag on a collar of the pet (e.g., a BLE transmitter). The controller 120 can operate one or more of the pump 134 to deliver liquids or the food dispenser 148 to deliver food based on the identification.

Upon detection of a pet by the controller 120, the controller 120 can also perform one or more actions or can limit performance of actions. For example, upon detection of Pet A, the controller 120 can monitor food intake from the food tray 106, such as based on the food sensor 114 and can update a record, log, or table, which can be updated for a given time period, such as over a day for the Pet A. The controller 120 can then determine when consumption of food by the pet A reaches a threshold minimum food intake or maximum intake. Optionally, the controller 120 can limit further dispensing of food for the Pet A when the maximum intake is determined to be reached and can transmit an alert.

In a similar example where an environment includes a second pet, Pet B, the controller 120 can limit dispensing of food when the Pet A reaches its maximum. However, the controller 120 can detect Pet B and can dispense food for consumption by Pet B and can maintain a record for consumption of food by the Pet B, such that the controller 120 can limit food dispensing for pet B once consumption by Pet B reaches a maximum.

In an example of a multi pet household, if food is dispensed for Pet B and the pet feeding system 100 determines that the dispensed food is uneaten, it is possible that the dispensed food may then be consumed by Pet A. When the controller 120 determines that food for Pet B is consumed by Pet A, the controller 120 can record or log the consumption by Pet A (and not Pet B). Optionally, when Pet B leaves food behind, the controller 120 can operate the actuator 184 to store the uneaten food until Pet B returns, such as to help prevent Pet A from eating the food of Pet B.

Similarly, the controller 120 can control dispensing from the medication hopper 152 or the supplement hopper 160 based on identification. For example, the controller 120 can dispense medication from the medication hopper 152 only upon detection of the Pet A. The controller 120 can also use the load cell 156 to determine an amount of medication remaining in the medication hopper 152. Upon a determination that the amount of medication is below a threshold an alert can be transmitted to a user device.

In an example of a multi pet household, if a supplement or medication is dispensed for Pet B and the pet feeding system 100 determines that the dispensed medication or supplement is unconsumed, it is possible that the dispensed medication or supplement may then be consumed by Pet A. When the controller 120 determines that medication or supplement for Pet B is consumed by Pet A, the controller 120 can record or log the consumption by Pet A (and not Pet B). Optionally, when Pet B leaves medication or supplement behind, the controller 120 can operate the actuator 184 to store the unconsumed medication or supplement until Pet B returns, such as to help prevent Pet A from eating the medication or supplement of Pet B.

The controller 120 can also detect non-pet users. For example, the controller 120 can determine, using one or more signals from the sensor system 118 and the food sensor 114, that a person, such as a child, removed food from the food tray 106. Upon such an occurrence, the controller 120 can transmit an alert to a user device or a network. The controller 120 can also operate the drawer actuator 184 to retract the tray assembly 104 when the controller 120 identifies a non-pet user, such as using an identification signal from one or more of the sensor system 118. The controller 120 can also operate the drawer actuator 184 to retract the tray assembly 104 when the controller 120 identifies a pet (e.g., Pet A) that has reached its maximum food intake for a time period and when the controller 120 determines there is food in the bowl for another pet (e.g., Pet B).

Optionally, the image capture device 122 can photograph foreign material placed in the food tray 106 or the liquid tray 108 (such as following detection by the food sensor 114 or the liquid sensor 116) and the controller 120 can produce and transmit a notification to the user based on the image or including the image of the foreign material. The controller 120 or the user device can include a catalog or list of items that can be dangerous to a pet. The list can be used to train a machine learning model, such as within the controller 120. The controller 120 can then use the model to determine that the foreign material added to the food tray 106 or the liquid tray 108 is hazardous and can perform one or more actions based on this determination. For example, the controller 120 can transmit an alert or can operate the drawer actuator 184 to reduce access to the hazardous material. The controller 120 can also operate the circulating pump 174 to remove the hazard from liquid tray 108. Optionally, the controller 120 can produce and transmit a high priority notification to the user to make them aware of the hazard.

The controller 120 can use the level signal or the load signal to determine an amount of fluid or liquid within the liquid hopper 112. The controller 120 can also use the load cell signal of the load cell 146 to determine an amount of food or liquid within the food hopper 112. The controller 120 can transmit an alert to a user device when the amount of liquid falls below a threshold amount or when an amount of food falls below a threshold amount.

The controller 120 can also identify a product label using, for example, the image capture device 122, such as when a new bag or container is opened and added to the food hopper 110. The controller 120 can, using the second transceiver 130 to communicate with a network, determine a total mass of food in the container. The controller 120 can track the use of food over time and produce an alert when the container or bag (which can be stored away from the feeder system)

falls below a threshold amount and can optionally automatically order a container or bag of food upon determining that the container has fallen below the threshold value.

Figure 2B:
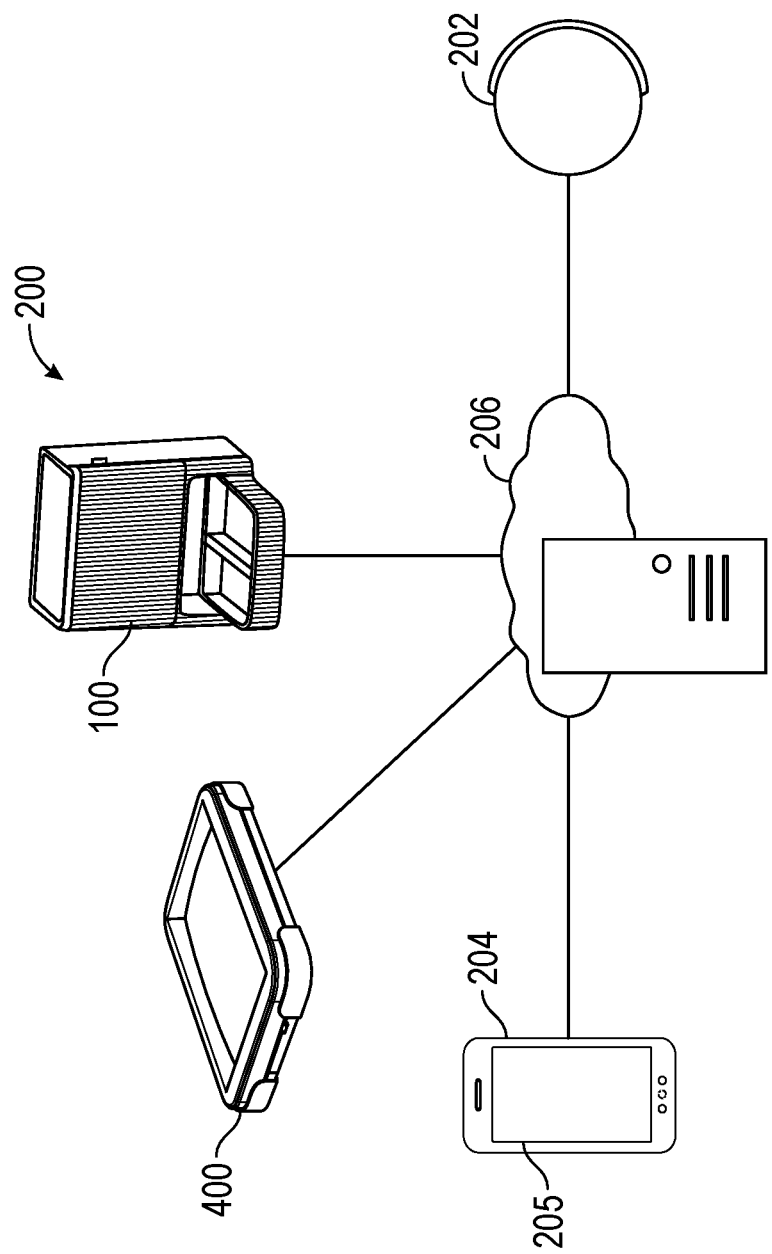
FIG. 2B illustrates a diagram illustrating a communication network.

FIG. 2B is a diagram illustrating an example communication network 200 that can enable networking between the pet feeding system 100 and one or more other devices, such as a mobile robot 202, a mobile device 204, a cloud computing system 206, or a pet bed 400 (discussed in further detail below). Using the communication network 200, the robot 202, the mobile device 204, the pet feeding system 100, the pet bed 400, and the cloud computing system 206 can communicate with one another to transmit and receive data from one another. In some examples, the robot 202, the pet feeding system 100, the pet bed 400, or all three can communicate with the mobile device 204 through the cloud computing system 206. Alternatively, or additionally, the robot 202, the pet feeding system 100, the pet bed 400 or all three can communicate directly with the mobile device 204. Various types and combinations of wireless networks (e.g., BLE, radio frequency, optical based, etc.) and network architectures (e.g., mesh networks) can be employed by the communication network 200.

In some examples, the mobile device 204 can be a remote device that can be linked to the cloud computing system 206 and can enable a user to provide inputs. The mobile device 204 can include user input elements such as, for example, one or more of a touchscreen display, buttons, a microphone, a mouse, a keyboard, or other devices that respond to inputs provided by the user. The mobile device 204 can also include immersive media (e.g., virtual reality) with which the user can interact to provide input. The mobile device 204, in these examples, can be a virtual reality headset or a head-mounted display.

The user can provide inputs corresponding to commands for the pet feeding system 100. In such cases, the mobile device 204 can transmit a signal to the cloud computing system 206 to cause the cloud computing system 206 to transmit a command signal to the pet feeding system 100. In some implementations, the mobile device 204 can present augmented reality images. In some implementations, the mobile device 204 can be a smart phone, a laptop computer, a tablet computing device, or other mobile device.

According to some examples discussed herein, the mobile device 204 can include a user interface configured to display one or more devices within the environment. The interface can receive a user instruction to modify a feeding schedule, updating a number of pets in an environment, or viewing a pet health status.

In some examples, the communication network 200 can include additional nodes. For example, nodes of the communication network 200 can include additional robots or pet devices. Also, nodes of the communication network 200 can include network-connected devices that can generate information about the environment 40. Such a network-connected device can include one or more sensors, such as an acoustic sensor, an image capture system, or other sensor generating signals, to detect characteristics of the environment 40 from which features can be extracted. Network-connected devices can also include home cameras, smart sensors, identification devices, activity trackers, or the like.

The mobile device 204 can be configured to receive information from one or more devices of the communication network 200 such as alerts and data. For example, the mobile device 204 can receive one or more alerts (such as those described above) from the second transceiver 130 or the first transceiver 128 of the pet feeding system 100. The mobile device 204 can also receive alerts or data from the pet bed 400, as discussed below.

The mobile device 204 can also be configured to display a dashboard on a screen 205 of the device. The dashboard can be configured to display food dispensing or liquid dispensing activities throughout a day, such as based on one or more signals from the pet feeding system 100. The mobile device 204 or the pet feeding system 100 can also store data from one or more sensors of the pet feeding system 100 or from one or more determinations made by the controller 120 or the mobile device 204. The pet feeding system 100 or the mobile device 204 can use the stored data to determine trends, such as short-term or long-term trends including eating and drinking trends of a pet. Regular analysis of the trends, including in comparison to new data, can help the controller 120 or the mobile device 204 determine health or wellness of a pet. For example, a sharp decrease in food or liquid intake can indicate a health problem of the pet.

The trends or determinations can be displayed on the dashboard of the screen 205 to help inform a user of trends and activities of one or more pets interacting with the pet feeding system 100 or the pet bed 400. Any or all data reported from devices of the pet feeding system 100 or the pet bed 400 can be used as a general health metric, which can be indicated on a dashboard (such as a dashboard presented to the user on the user device), such as based on their metrics for that day compared to metrics collected historically. This comparison can provide a baseline and comparison, helping the user to assess health and wellness of their pet.

The pet feeding system 100 or the mobile device 204 can also receive information from auxiliary devices, such as a pet tracking device. For example, hourly activity of a pet can be transmitted to the controller 120 or to the mobile device 204 and the controller 120 or the mobile device 204 can determine, based on the activity of the pet, whether an adjustment to the food or liquid settings (e.g., minimum or maximum) should be made. Such adjustments can be transmitted, for example, from the mobile device 204 to the controller 120 for control of the pump 134 or the food dispenser 148.

Other devices of the communication network 200 can also work together. For example, the pet feeding system 100 can transmit to the communication network 200 that food has been dispensed and consumed, indicating that cleaning of the area may be required. Any of the devices of the communication network 200 can instruct the robot 202 to initiate a cleaning mission around the pet feeding system 100 such as to vacuum or mop (or both) an area around the pet feeding system 100. Optionally, during such a mission, the robot 202 can use a camera or other sensors to detect whether food was taken out of the food tray 106 and not consumed. Upon such a detection, the robot 202 can transmit an alert to the mobile device 204 to notify the user and can adjust its dashboard. Optionally, the pet feeding system 100 can modify the daily food allotment based on food detected out of the food tray 106 by the robot 202.

In the communication network 200, the wireless links can utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, 6G, or the like. The network standards, if utilized, qualify as, for example, one or more generations of mobile telecommunication standards by fulfilling a specification or standards such as the specifications maintained by International Telecommunication Union. For example, the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

Figure 3A:
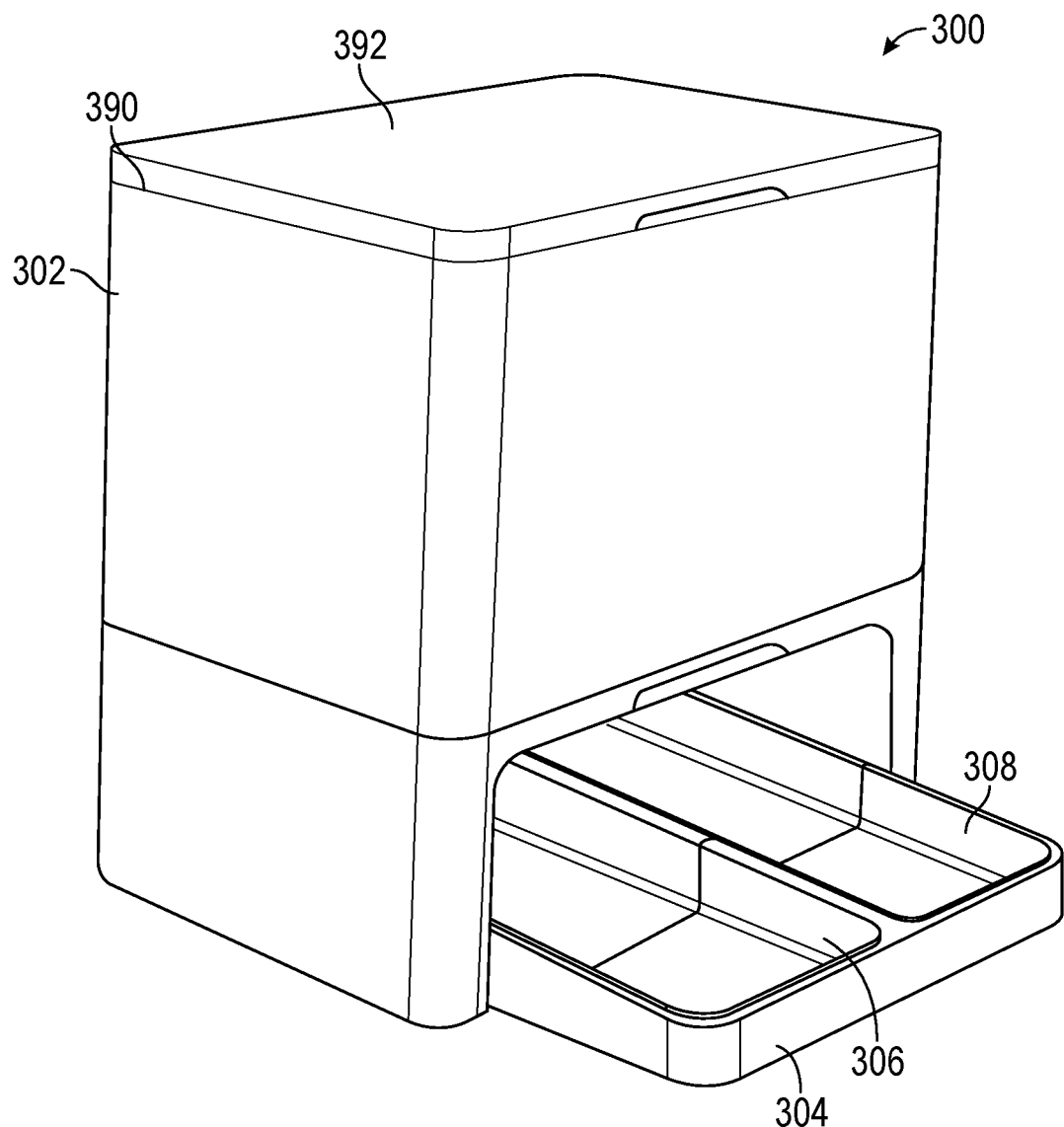
FIG. 3A illustrates a perspective view of a pet feeding system and FIG. 3B illustrates a perspective view of a pet feeding system.
Figure 3B:
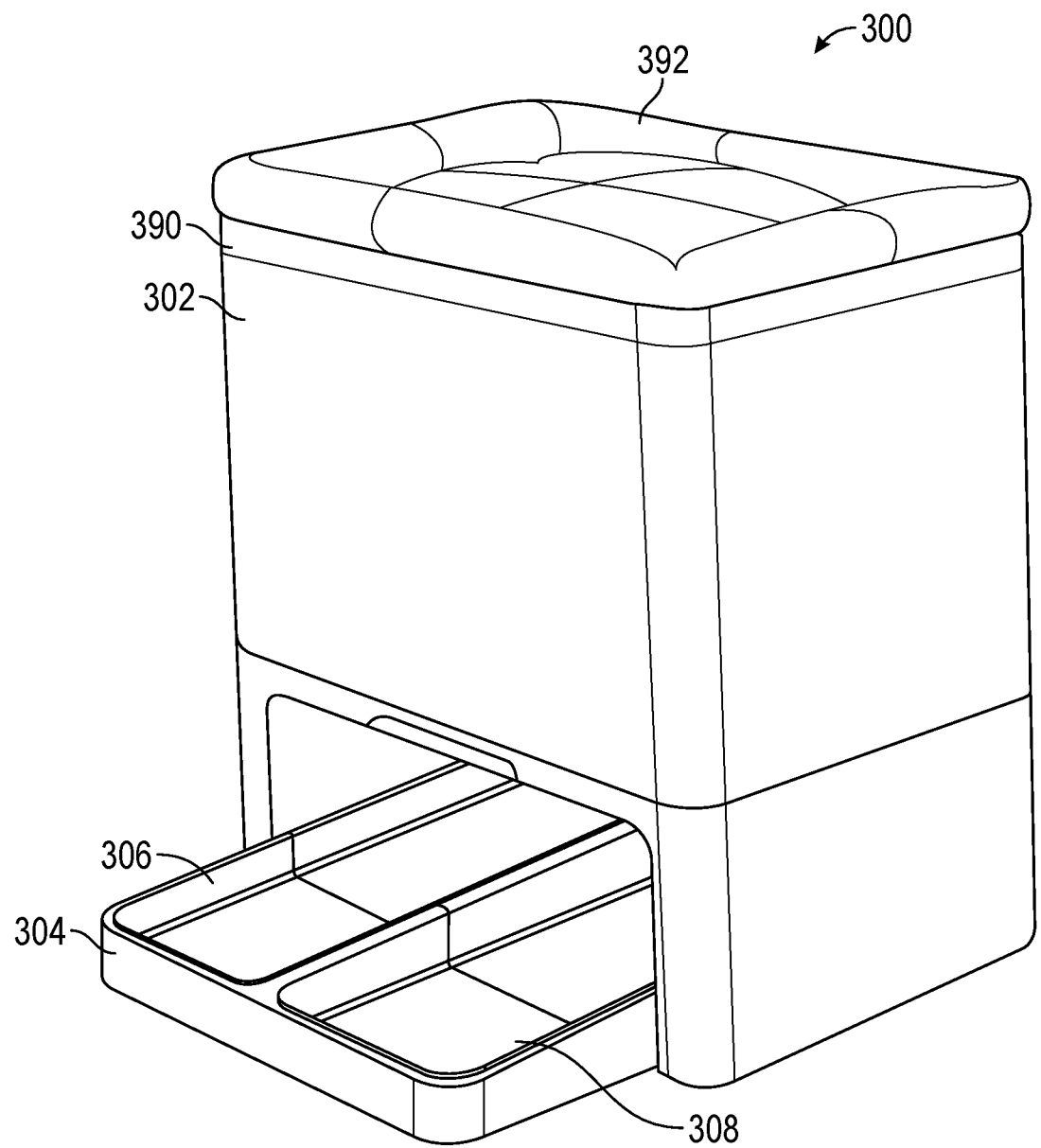

FIG. 3A illustrates a perspective view of a pet feeding system 300. FIG. 3B illustrates a perspective view of a variation of the pet feeding system 300. The pet feeding system 300 can be similar to the pet feeding system 100 discussed above; the pet feeding system 300 can include an integrated cushion or bed. Any of systems discussed above or below can be modified to include the features of the pet feeding system 300.

More specifically, FIG. 3 shows that the pet feeding system 300 can include a housing 302, a tray assembly 304, a food tray 306, and a liquid tray 308. As shown in FIG. 3B, the housing 302 can include a support 390 at a top portion of the housing 302, where the support 390 can be configured to support a cushion 392 therein or thereon. The support 390 and the cushion 392 can together form a bed or rest area for a pet. The cushion 392 can optionally be integrated into the support 390 or can be separate or connectable to the support 390.

Figure 4:
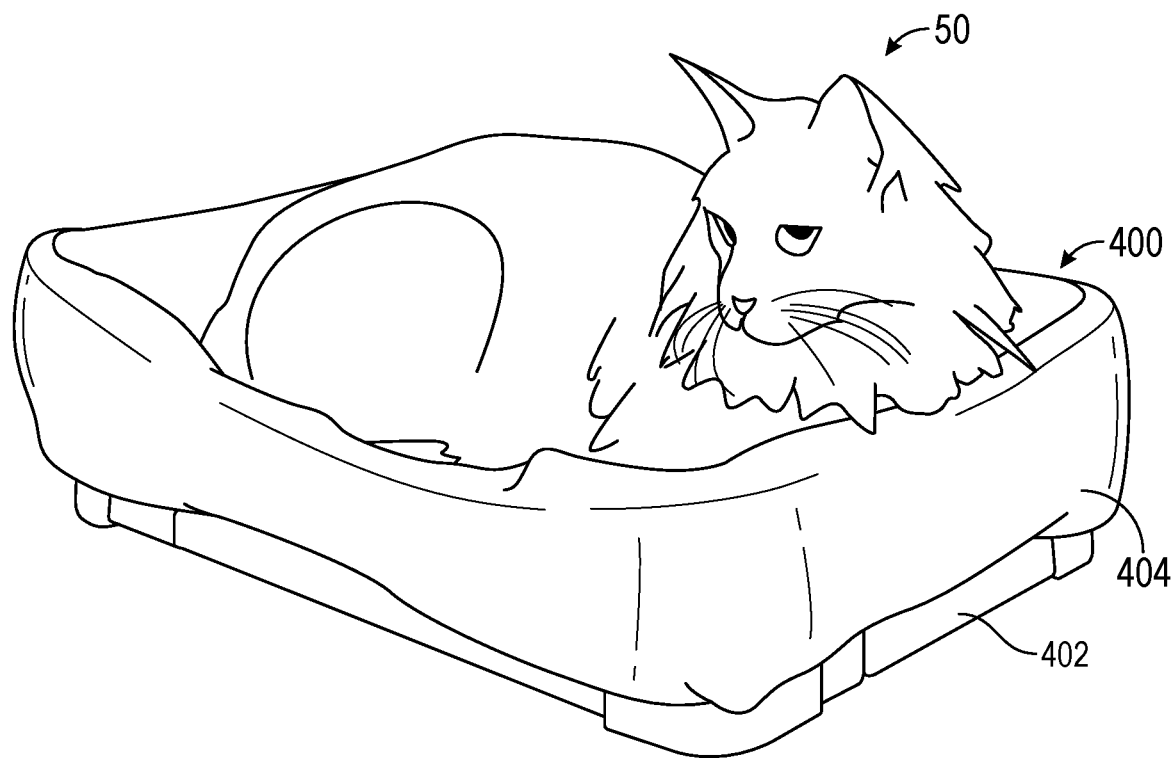
FIG. 4 illustrates a perspective view of a pet bed system.

FIG. 4 illustrates a perspective view of a pet bed system 400. The pet bed 400 can include a frame 402 engageable with a floor surface and configured to support a cushion 404 on or at least partially above the floor surface. The frame 402 and the cushion 404 can together form a bed or rest area for a pet 50. The frame 402 can be a smart frame, such as a frame including one or more sensor or actuators. Optionally, the frame 402 can be a manually adjustable or mechanical frame. Further details of the pet bed 400 are discussed below.

Figure 5B:
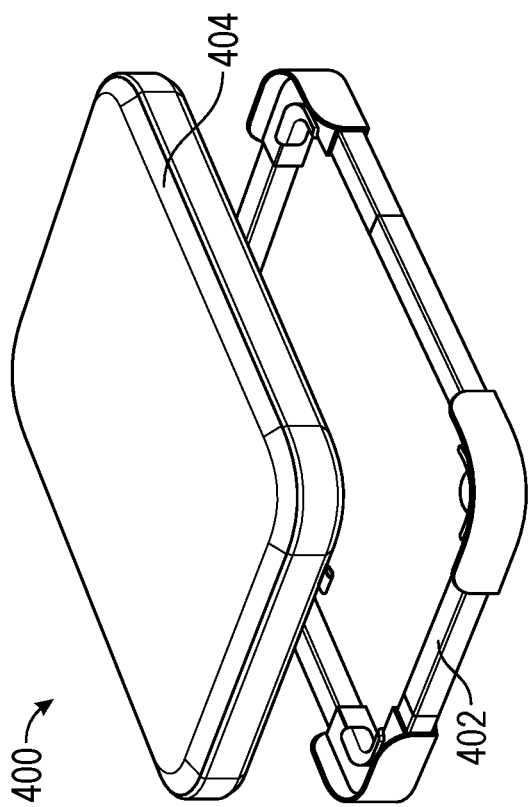
FIG. 5B illustrates an isometric exploded view of a pet bed system.
Figure 5C:
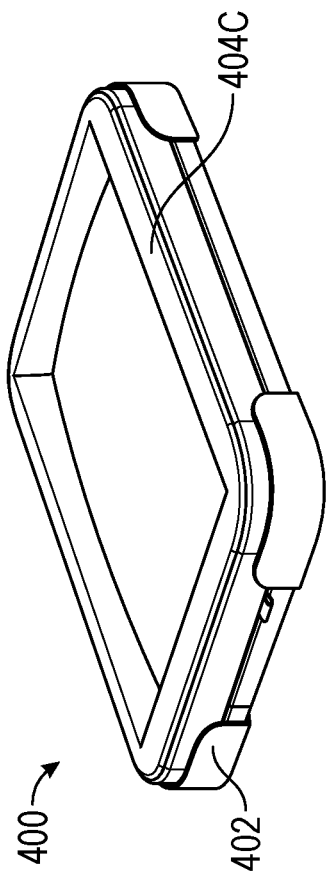
FIG. 5C illustrates an isometric view of a pet bed system.
Figure 5A:
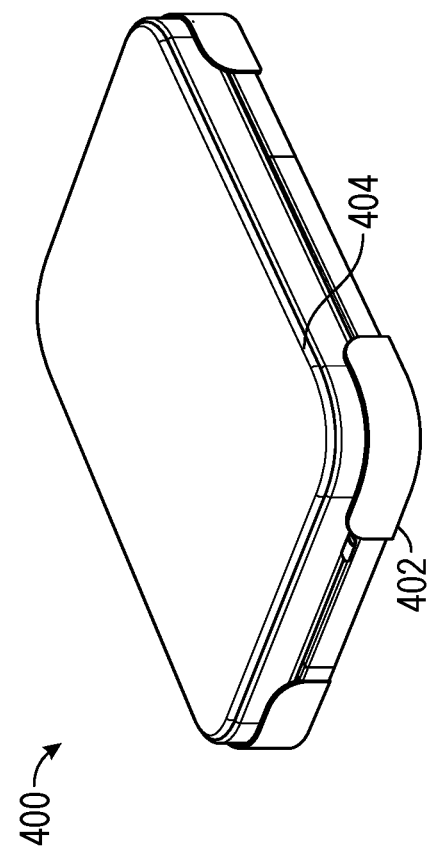
FIG. 5A illustrates an isometric view of a pet bed system.

FIG. 5A illustrates an isometric view of the pet bed system 400. FIG. 5B illustrates an isometric exploded view of the pet bed system 400. FIG. 5C illustrates an isometric view of the pet bed system 400. FIGS. 5A-5C are discussed together below.

The pet bed system 400 can be consistent with the pet bed 400 discussed above. FIG. 5B shows that the cushion 404 can be removed or separated from the frame 402 so that the frame 402 can be adjusted. Optionally, the cushion 404 can be separable from the frame 402, such as for cleaning of the 404 or replacement of the cushion 404. FIG. 5C shows that, following removal of the cushion 404, the frame 402 can receive a different cushion 404C. In this way, the pet bed 400 can be optimized for pets of various sizes and weights using the adjustability of the frame 402.

Figure 6C:
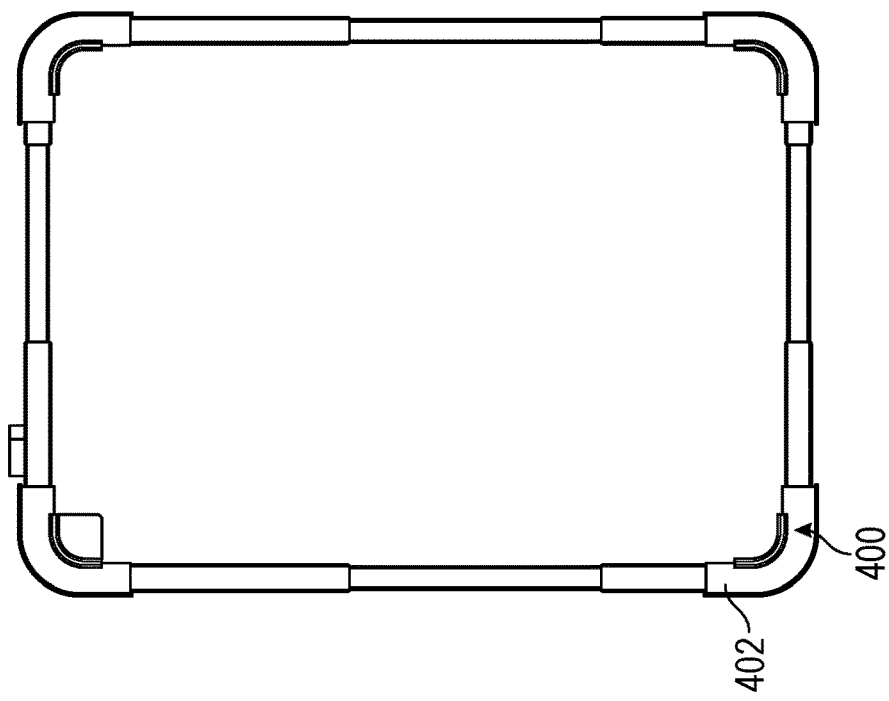
FIG. 6C illustrates a top view of a pet bed system in a third condition
Figure 6B:
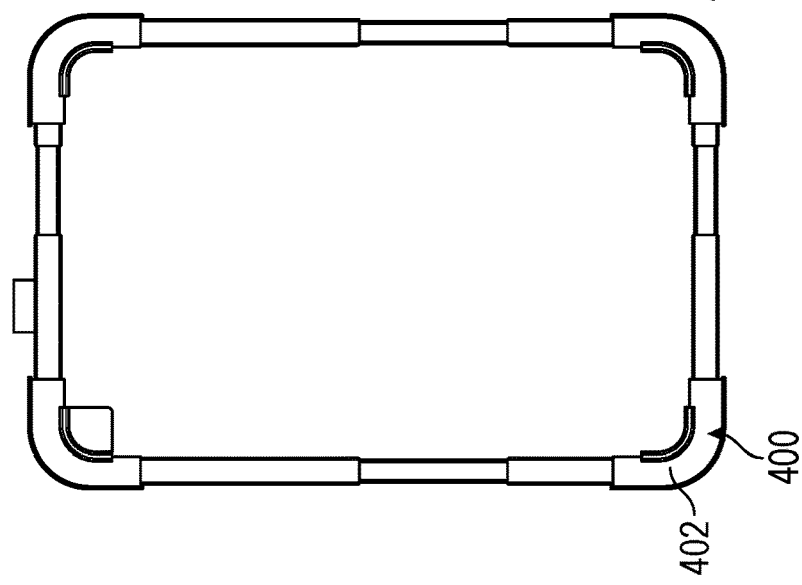
FIG. 6B illustrates a top view of a pet bed system in a second condition
Figure 6A:
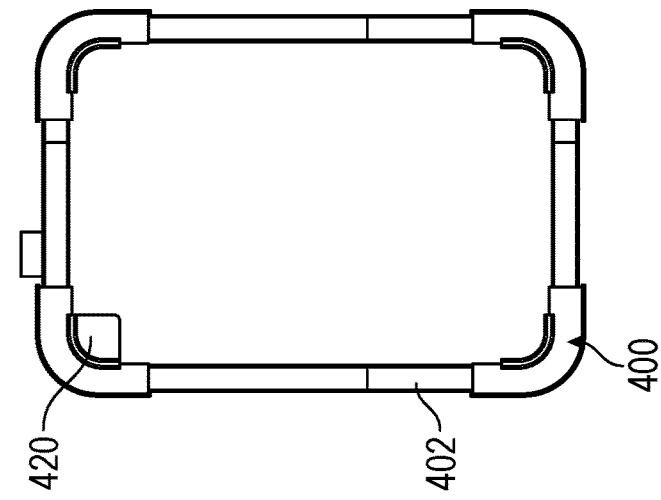
FIG. 6A illustrates a top view of a pet bed system in a first condition

FIGS. 6A-6C are discussed together below and show how the frame 402 of the pet bed 400 can be adjusted to various sizes. For example, FIG. 6A illustrates a top view of the frame 402 in a small size configuration, FIG. 6B illustrates a top view of the frame 402 in a medium size configuration, and FIG. 6C illustrates a top view of the frame 402 in a large size configuration. As discussed in further detail below, the frame 402 can be adjusted between the various sizes shown (and optionally other sizes) to accommodate cushions (and pets) of various sizes.

The pet bed 400 can include a controller 420 connected to the frame 402. The controller 420 can connect to the communication network 200 and can interface with one or more of the sensors of the pet bed 400, such as sensors embedded in the frame 402, load cells, or the sensor system 421. The controller 420 can also interface with a port/interface to an accessory module 424 allowing optional components to be connected to the controller 420 that may be available for the pet bed, such a Camera monitor, Speaker, Microphone, treat dispenser, calming diffuser, or the like, as discussed in further detail below.

Figure 7:
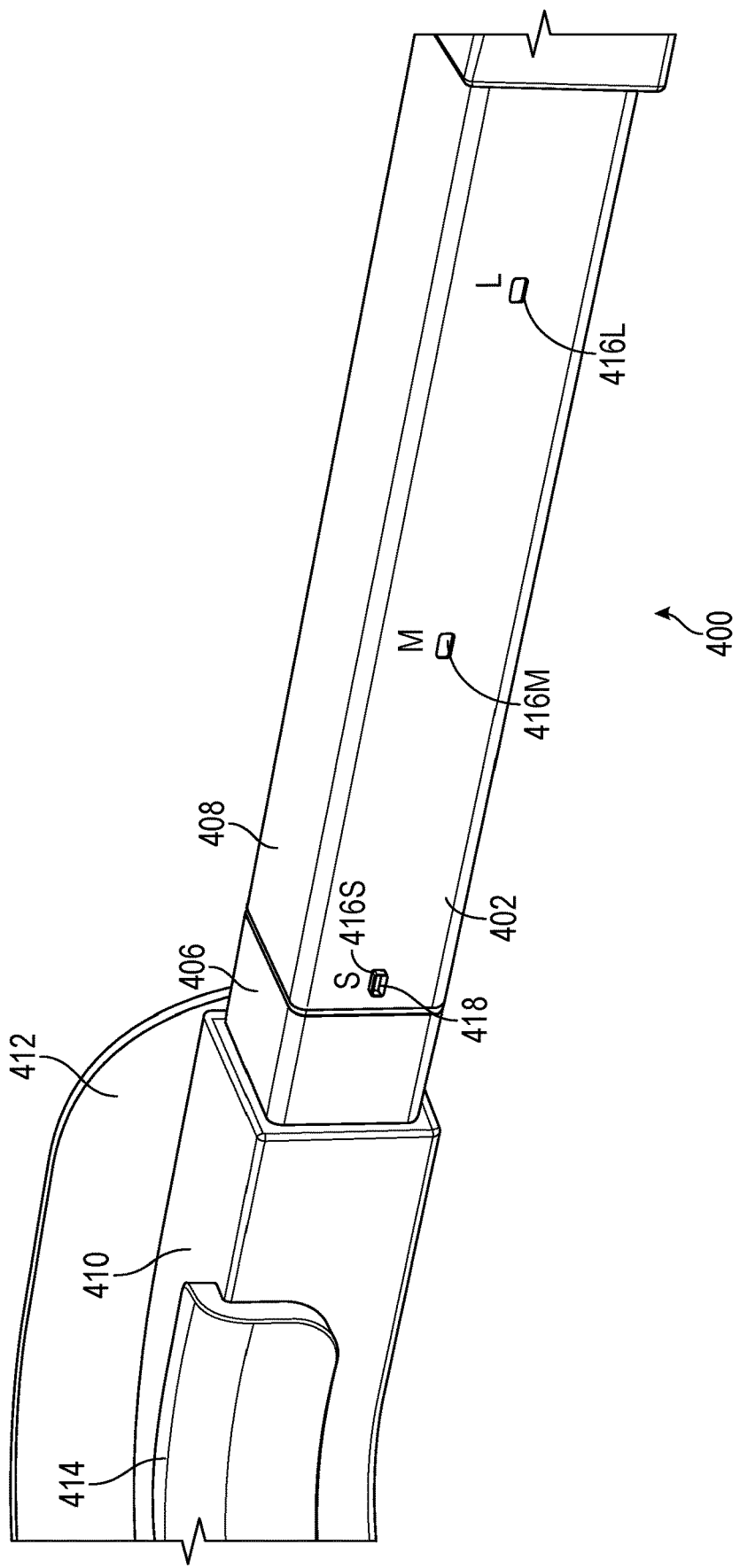
FIG. 7 illustrates an enlarged isometric view of a portion of a pet bed system.

FIG. 7 illustrates an enlarged isometric view of a portion of the pet bed system 400, specifically the frame 402 thereof. The pet bed 400 can be consistent with the pet bed 400 discussed above. FIG. 7 shows additional details of the pet bed 400. For example, FIG. 7 shows that the frame 402 can include a corner member 406 and a side member 408. The pet bed 400 can also include a corner support 410 connected to the corner member 406. The corner support 410 can include a vertical portion 412 extending upward from the 406 configured to laterally support the cushion 404. The corner support 410 can also include a support 414.

The side member 408 can include sizing notches 416S, 416M, and 416L. Each of the notches 416 can be a hole or bore in the side member 408 configured to receive a sizing button 418 (or portion thereof) at least partially therein. The frame 402 can include four buttons, one on each side, or can include one button operable to change a size of the entire frame.

The sizing button 418 can be an actuator biased toward an extended position (shown in FIG. 7) that is user-operable (including end-user operable) to move to a retracted position for increasing or decreasing a size of the frame 402. For example, when the actuator is located in the notch 416$s$, the frame can be a small size, as shown in FIG. 6A. When the actuator is located in the notch 416$m$, the frame can be a medium size, as shown in FIG. 6B. When the actuator is located in the notch 416$l$, the frame can be a large size, as shown in FIG. 6C. In this way, the frame 402 can be user-operable to adjust a size of the frame. One or more actuators can be operated to adjust a size of the frame 402 or a single actuator can be operated. For example, the frame 402 can include four side members 408, each including an actuator.

The frame 402 can also be used to perform autonomous sizing or footprint reduction. For example, the frame 402 can include one or more actuators operable to adjust a size of the frame 402 and can optionally include a cushion capable of scaling along with the frame 402. The frame 402 can be adjusted by the 420 automatically or autonomously, such as to accommodate growth of the pet so that the bed is properly sized for their pet. The controller 420 can also operate the actuators to reduce a size or footprint of the frame 402 as determined by the user (such as based on a signal received from a user device). For example, if a user indicates a desire for the pet bed 400 to take up less floor space when the pet bed 400 was not in use, the controller 420 can automatically reduce a size of the frame 402 when it determines that bed is not in use. Optionally, the user can use the user device (or can interface directly with the pet bed 400) reduce a size of the frame 402 before an event (e.g., a party).

Figure 8:
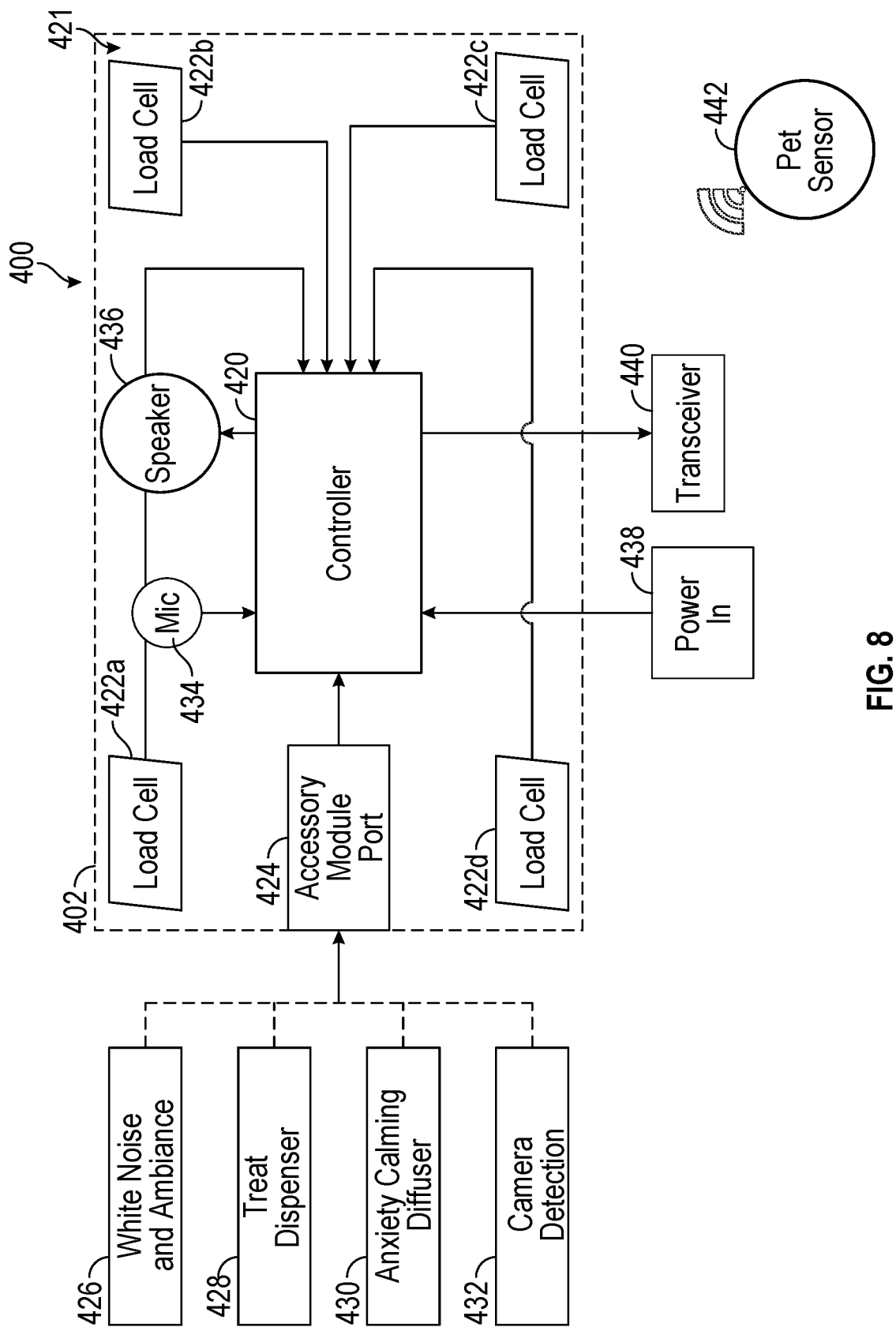
FIG. 8 illustrates a schematic view of a pet bed system.

FIG. 8 illustrates a schematic view of a pet bed system 400. The pet bed 400 can be consistent with FIGS. 4-7 discussed above; FIG. 8 shows, schematically, how various components of the pet bed 400 can be connected. For example, FIG. 8 shows that the pet bed 400 can include a controller 420 that can be connected to or located within the frame 402. The controller 420 can be a programmable controller, such as a single or multi-board computer, a direct digital controller (DDC), a programmable logic controller (PLC), or the like. In other examples the controller 420 can be any computing device, such as a handheld computer, for example, a smart phone, a tablet, a laptop, a desktop computer, or any other computing device including a processor, memory, and communication capabilities.

The pet bed 400 can also include a sensor system 421 including, for example, sensors 422a-422d. The sensor system 421 can include one or more sensors or systems, such as load cells 422a-422d. The sensors 422a-422d can be other types of sensors in other examples. The sensors 422a-422d can be connected to the frame 402 and can be in communication with the controller 420 such as to transmit a load signal (e.g., from each of the sensors 422a-422d) to the controller 420.

The pet bed 400 can also include an accessory module port 424 that can be connected to the frame 402 and can be in communication with the controller 420. The accessory module port 424 can be a wireless interface (e.g., BLE) or a wired interface (e.g., Universal Serial Bus (USB)) configured to connect to one or more accessory devices, such as a white noise device 426, a treat or food dispenser 428 (such as the pet feeding system 100), a diffuser 430 (such as a scent or pheromone diffuser), or an image capture device 432. Any of the accessory devices can be connected to the frame 402 and integrated into the pet bed 400 or can be independent devices incorporated or connected by a user. The image capture device 432 can be connected to the frame 402 and configured to transmit an image capture signal to the controller 420 based on imagery of an environment of the pet bed 400, such as one or more pets or persons within the environment.

The sensor system 421 can also include an audio sensor 434, such as a microphone. The audio sensor 434 can be connected to the frame 402 and can be configured to transmit an audio signal to the controller 420 based on one or more sounds of an environment of the pet bed 400. The pet bed 400 can also include a speaker 436 configured to emit sounds, such as produced based on a speaker signal from the controller 420.

The pet bed 400 can also include a power supply 438 connected to the frame 402. The power supply 438 can be connected to any of the components of the pet bed 400 such as to deliver power thereto. The pet bed 400 can also include a transceiver 440, which can be, for example, a low energy BLE transceiver. The transceiver 440 can be in communication with the controller 420 and can be configured to interact with one or more devices or components of the pet bed 400, one or more external devices, or a network (e.g., the communication network 200). Also shown in FIG. 8 is a pet sensor 442, which can be a transceiver configured to communicate with the controller 420, such as through the transceiver 440.

In operation of the pet bed 400, one or more of the sensors of the sensor system 421 can be configured to produce a sensor signal based on a condition of the cushion 404 or the frame 402, which can be transmitted to the controller 420. The controller 420 can receive the one or more signals and can make one or more determinations based on the signals. Optionally, the controller 420 can produce and transmit an alert (e.g., through the transceiver 440 or another transceiver) to another device, such as the mobile device 204 of the communication network 200.

In one example, the controller 420 can receive a signal from one or more of the sensors 422, which can be, for example, a plurality of load cells connected to the frame 402.

The controller 420 can receive the one or more load cell signals to make one or more determinations. The controller 420 can determine a mass or weight of the pet. The controller 420 can also determine occupancy or an amount of time spent by the pet in the pet bed 400, which can be correlated to sleeping or resting time of the pet. When the frame 402 is occupied, the frame 402 can use one or more signals from the load cells 422a-d to determine if the pet is resting or restless/active and the controller 420 can log this time, which can be correlated to each mode. The controller 420 can transmit the determinations to an external device (such as the mobile device 204) and can optionally produce and transmit an alert based on one or more of the signals.

The controller 420 can also identify a pet, such as based on an identification signal produced by the transceiver 440 based on one or more interactions with the pet sensor 442. The controller 420 can be configured to produce an alert or transmit data based on the identification signal and based on one or more signals of the sensors 422. For example, the controller 420 can determine an amount of rest time for a particular pet (e.g., Pet A) based on the identification signal and based on signals from the sensors 422. The controller 420 can also identify a pet based on its weight (e.g., using signals from the sensors 422), such as if there are multiple pets in the home that are of different weights. For example, Pet A can be identified because it weighs 10 kilograms, and pet B can be identified because it weighs 22 kilograms.

The controller 420 can also use the identification signal and one or more signals of the sensors 422 to determine a weight of the pet or a weight over time. The weight can be determined, for example, each time the pet uses the pet bed 400 or once per day. The weight can be transmitted to the mobile device 204 for storage by the mobile device 204 (or can be stored at the controller 420 or in memory associated with the pet bed 400). Optionally, the controller 420 or the mobile device 204 can produce an alert based on the stored weights, such as when the weight increases or decreases relatively quickly over time. Optionally, the controller 420 can determine when the pet bed 400 is occupied and the pet is resting before determining a weight of the pet based on the sensors 422, to help increase measurement accuracy. The controller 420 can determine if the calculated pet weight is out of a range (such as 25 percent over or under a weight of the pet) and can ignore such determinations. This can help to avoid logging incorrect data from instances where a pet lays partially on the bed and partially on the floor or another object.

In some examples, the controller 420, the controller 120, or the mobile device 204 can make a recommendation to adjust a food intake based on the weight or weight over time. When an adjustment is accepted, such as by a user via the mobile device 204, the controller 120 can adjust an amount of food dispensed by the food dispenser 148, such as an amount of food dispensed per day.

In some examples, when an environment includes the pet feeding system 100 and the pet bed 400, the controller 420 can be in communication with the controller 120 and either the controller 120 or the controller 420 can make one or more correlations based on diet and weight. For example, a pet who has not been eating their full serving of food for several days could be further indicated by a loss of weight detected by the pet bed 400. Further, additional insight into the health of the pet can be gained combining the historical collection and baseline of data the system has for food, water, weight, and rest along with general guideline health information for a specific breed of pet. For example, a notification can be sent to the user if either the controller 420 or the controller 120 determine that their pet is eating twice as much food as recommended, while getting more rest than average for the dogs breed and age, and as a result is significantly heavier than average.

Figure 9:
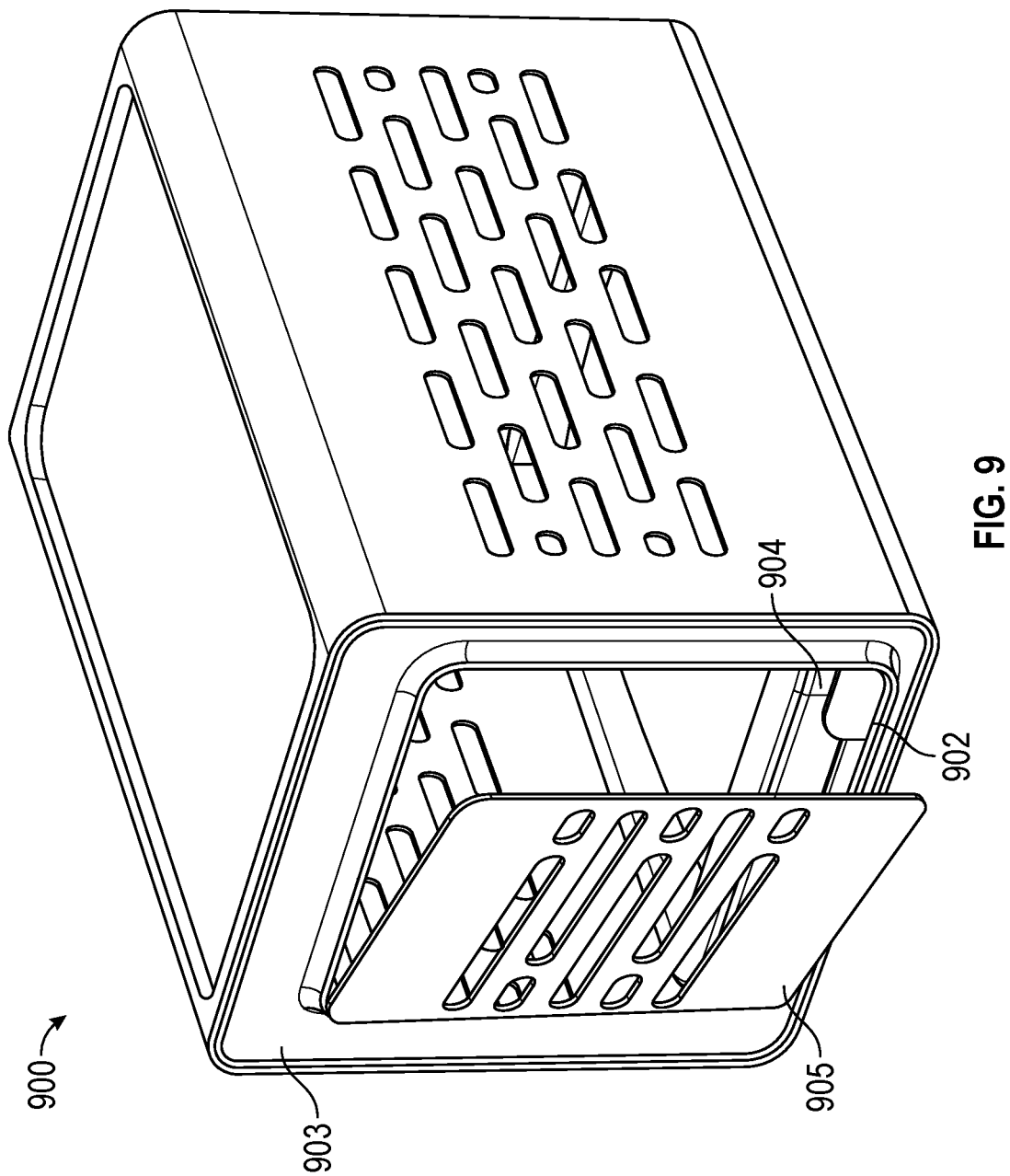
FIG. 9 illustrates an isometric view of a pet bed system.

FIG. 9 illustrates an isometric view of a pet crate system 900. The pet crate system 900 can be similar to the pet bed 400 discussed above; the pet crate system 900 can include an enclosure, such as a crate. Any of the systems discussed above or below can be modified to include the features of the pet crate system 900.

More specifically, the pet crate system 900 can include a frame 902, a cushion 904, a housing 903, and a door 905. The frame 902 and the cushion 904 can be similar to the frame 402 and the cushion 404, respectively, discussed above. Alternatively, the housing 903 and door 905 can be configured to receive the pet bed 400 including the frame 402 and cushion 404. The housing 903 can be connected to the frame 902 or can support the frame 902 therein. The housing 903 can also support the cushion 904 therein. The door 905 can be connected to the housing 903 such as to open and close the housing 903.

Figure 10:
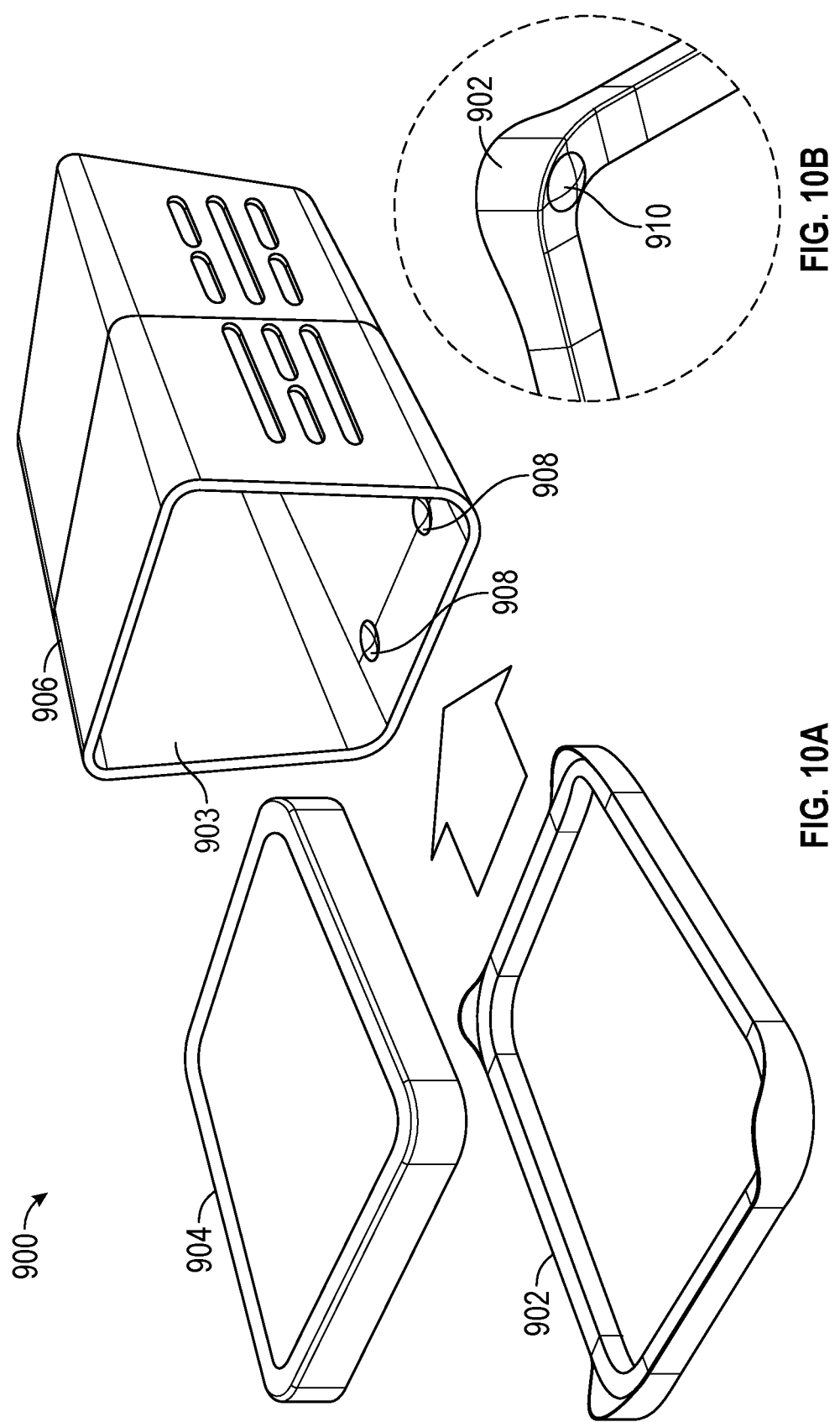
FIG. 10A illustrates an exploded perspective view of a pet bed system.
FIG. 10B illustrates an enlarged perspective view of a portion of pet bed system.

FIG. 10A illustrates an exploded perspective view of the pet crate system 900. FIG. 10B illustrates an enlarged perspective view of a portion of the pet crate system 900. The pet crate system 900 can be consistent with the pet crate system 900 discussed above. FIGS. 10A and 10B show additional details of the pet crate system 900. For example, FIG. 10A shows that the frame 902 and the cushion 904 can be removed from the housing 903, such as to use the frame 902 and the cushion 904 independently (without the housing 903). The frame 902 and the cushion 904 can also be user-removable (including end-user removable) to adjust a size of the frame 902 (as discussed above with respect to the frame 402) or a size of the housing 903. For example, the housing 903 can include a joint 906 allowing the crate to move between an expanded and a contracted position.

FIG. 10A also shows that the housing 903 can include recesses 908 configured to receive projections 910 of the frame 902 (shown in FIG. 10B). The projections 910 can be connected to the frame 902 and located, for example on or near each corner on an underside of the frame 902. The projections 910 can be locatable at least partially within the recesses 908 such as to orient the frame 902 with respect to the housing 903 and to help limit movement of the frame 902 with respect to the housing 903.

Figure 11:
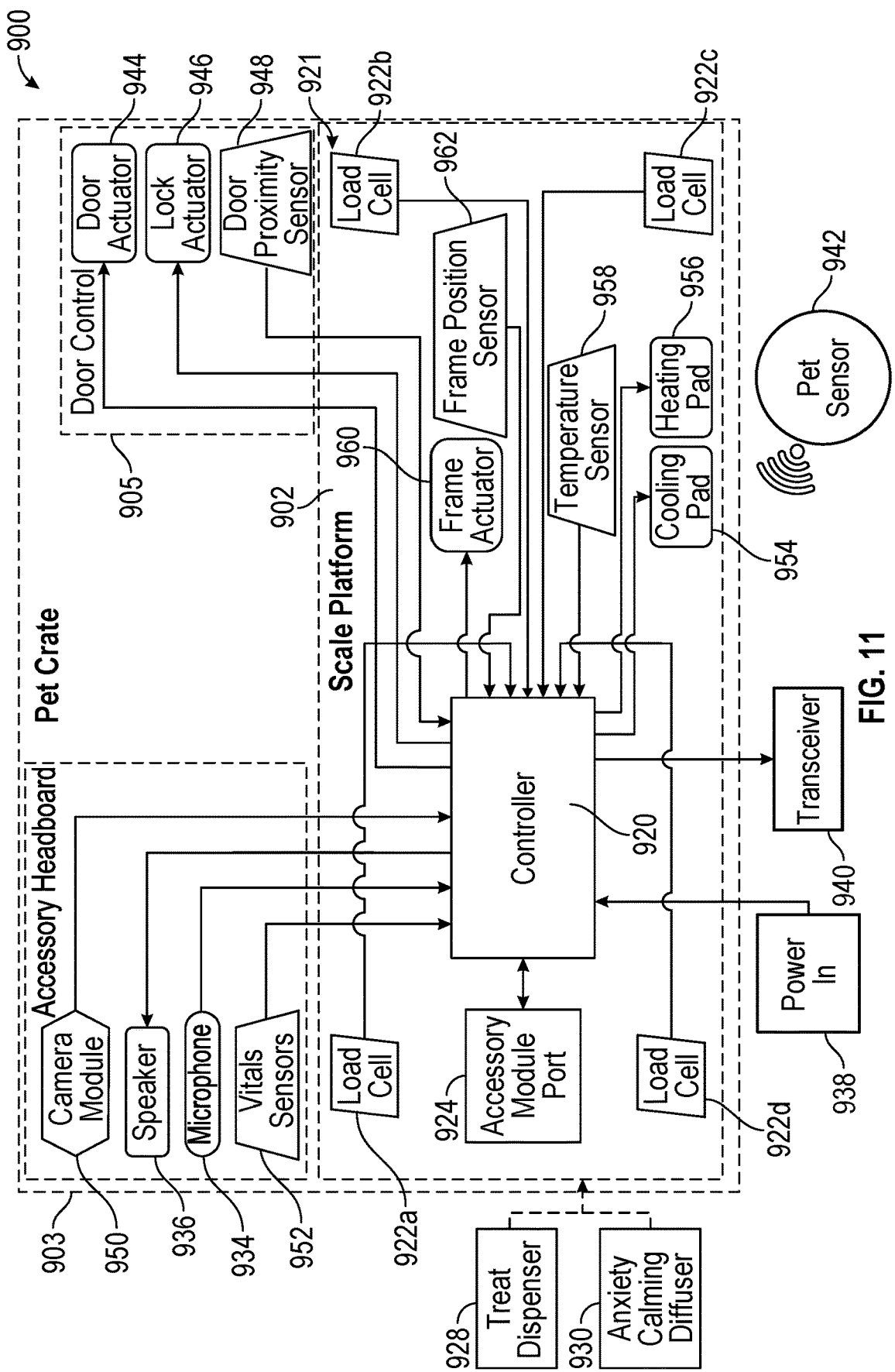
FIG. 11 illustrates a schematic view of a pet bed system.

FIG. 11 illustrates a schematic view of the pet crate system 900. The components of the pet crate system 900 can be consistent with the pet bed 400 such that like numerals can represent like components. For example, the pet crate system 900 can include a controller 920, a sensor system 921, sensors 922, an accessory module port 924, a treat or food dispenser 928, a diffuser 930, an audio sensor 934, a speaker 936, a power supply 938, a transceiver 940, and a pet sensor 942.

These components can be connected and can operate similarly to those discussed with respect to the pet bed 400; the pet crate system 900 can include additional features or components. For example, the pet crate system 900 can include controls for the door 905, such as a door actuator 944, a lock actuator 946, and a proximity sensor 948. The door actuator 944, the lock actuator 946, and the proximity sensor 948 can be connected to one or more of the door 905 and the housing 903 and can be in communication with the controller 920. The controller 920 can operate the door actuator 944 to open and close the door 905 with respect to the housing 903 such as to allow a pet to enter or exit the housing 903. The controller 920 can operate the lock actuator 946 to lock the door 905 to the housing 903, such as in a closed position.

The pet crate system 900 can also include an image capture device 950 (e.g., a camera). The image capture device 950 can be connected to the housing 903 and can be configured to transmit an image capture signal to the controller 920 based on imagery of an environment of the pet crate system 900, or within the housing 903, such as one or more pets or persons. The pet crate system 900 can also include one or more vitals sensors 952. The one or more vitals sensors 952 can be connected to the housing 903 or the frame 902 (or the cushion 904) and can be in communication with the controller 920. The one or more vitals sensors 952 can include a heart rate monitor, oxygen sensor, pulse oximeters, electrocardiogram, or the like.

The pet crate system 900 can also include a cooling pad 954 and a heating pad 956. The cooling pad 954 and the heating pad 956 can be connected to the housing 903 or the frame 902 and can be in contact with the cushion 904 such as to provide cooling or heating, respectively, to the cushion 904 and a pet therein. The cooling pad 954 and the heating pad 956 can also be in communication with the controller 920 such that the controller 920 can control operation of the cooling pad 954 and the heating pad 956. The pet crate system 900 can also include a temperature sensor 958 that can be connected to the frame 902, the housing 903, or the cushion 904.

The pet crate system 900 can also include a frame actuator 960 and a frame position sensor 962. The frame actuator 960 can be connected to one or more parts of the frame and can be in communication with the controller 920. The frame position sensor 962 can be connected to the frame actuator 960 and can be in communication with the controller 920. Optionally, the frame position sensor 962 can be integral to the frame actuator 960.

In operation, the controller 920 can operate the frame actuator 960 to adjust a size of the frame 902 between an expanded position and a contracted position, such as by modifying a length or width of the frame 902. The frame position sensor 962 can transmit a position signal to the controller 920 allowing the controller 920 to determine a size (e.g., length or width) of the frame 902. In some examples, the controller 920 can receive a signal from a user device (e.g., the mobile device 204) to select a size of the frame 902 and can operate the frame actuator 960 to adjust the size of the frame 902 accordingly. Also, the controller 920 can identify a pet, such as using an identification signal from the transceiver 940 or using an image signal from the image capture device 950 and can change the size of the frame 902 based on the identified pet. Optionally, the controller 920 can detect the presence of a pet using signals from one or more of the transceiver 940, the image capture device 950, or load cells 922, and the controller 920 can limit or prevent any adjustment of the crate size when a pet is detected.

In some examples, the controller 920 can operate the door actuator 944 and the lock actuator 946 based on identification of a pet, which can be determined by the controller 920 using an identification signal from the transceiver 940 or using an image signal from the image capture device 950. The controller 920 can also operate the door actuator 944 and the lock actuator 946 based on identification and one or more other signals or criteria, such as a predetermined schedule.

Also, in operation, the controller 920 can monitor one or more of the sensors of the sensor system 921 and can produce an alert upon occurrence of one or more events or when a threshold is exceeded. For example, when the one or more vitals sensors 952 is a heart rate monitor, the controller 920 can produce an alert when the heart rate is determined to be above a threshold or below a threshold (or out of a range).

The controller 920 can also operate the cooling pad 954 or the heating pad 956, such as based on a temperature signal from the temperature sensor 958 and one or more signals from other devices, such as the mobile device 204. For example, the mobile device 204 can deliver a setpoint temperature to the controller 920, and the controller 920 can operate the cooling pad 954 or the heating pad 956 to maintain the cushion 904 or an air temperature within the housing 903 to the setpoint temperature. Optionally, the mobile device 204 can interface with other third-party applications to enable a heating or cooling pad. For example, a smart thermostat on the mobile device 204 can determine or receive a temperature of the environment and can determine whether the temperature is above or below a certain threshold. The controller 920 can autonomously enable a heating or cooling pad in the crate when the temperature is determined to be outside the range or beyond the threshold.

Also, the controller 920 can transmit data or alerts (such as those described above) to one or more devices of the communication network 20, such as the mobile device 204. The mobile device 204 can also be configured to display a dashboard on a screen 205 of the device. The dashboard can be configured to display information about the pet crate system 900 throughout a day, such as based on one or more signals from the pet crate system 900. The mobile device 204 or the pet crate system 900 can also store data from one or more sensors of the pet crate system 900 or from one or more determinations made by the controller 920 or the mobile device 204.

The pet crate system 900 or the mobile device 204 can use the stored data to determine trends, such as short-term or long-term trends including eating and drinking trends of a pet. Regular analysis of the trends, including in comparison to new data, can help the controller 920 or the mobile device 204 determine health or wellness of a pet. The pet crate system 900 or the mobile device 204 can use any or all data reported from devices in the system. For example, data from the pet feeding system 100 or the pet bed 400 can be used to determine a general health metric associated with a pat, which can be indicated on the dashboard based on their metrics for a given day compared to metrics collected historically, such as to provide a baseline, e.g., for comparison.

In some examples, the daily dashboard can display one or more data points per day, which can help a user to track, for example, rest of the pet. The controller 920 can determine pet rest based on one or more signals from the load cells 922, and the amount of rest can be displayed on the screen 205, such as in an hour-by-hour overview of rest. The controller 920 or the mobile device 204 can also perform long-term or trend analysis using data from the signals, which can be correlated to general health and wellness and can be used to identify potential health issues. The trends or correlated health and wellness can be displayed on the dashboard on the screen 205.

The pet crate system 900 can also be used for training a pet to stay or rest in the pet crate system 900, such as by automatically opening or locking the door 905 using the door actuator 944 or the lock actuator 946 based on a schedule or identification of the pet. The controller 920 can use one or more signals from the sensors 922 during a training period to monitor trends in rest, such as improvements in rest during the training period.

Optionally, one or more additional parameters in a mobile device application (e.g., of the mobile device 204) can allow for customization of when the pet can be let out of the pet crate system 900. For example, the controller 920 can open the door 905 after a set amount of time to help ensure the pet is rested before being free to play/roam. Optionally, the application could indicate that the door 905 should open automatically upon the mobile device 204 to a home network (such as following a period where the 204 has not been connected to the home network), enabling the pet to be let out of the crate 900 and waiting for their owner when returning home.

The controller 920 can also use one or more signals from the sensors 922 to determine sleep quality or restlessness, such as based on changes in the signals from the sensors 922. The controller 920 can also use one or more signals from the sensors 922 to determine where in the housing 903 (or frame 902) the pet is located when the restlessness occurs. The controller 920 can use this information (or one or more signals from the sensors 922) to monitor trends in restlessness and can transmit one or more alerts or data regarding restlessness to the mobile device 204. The controller 920 can also use the audio sensor 934 to help with restlessness, such as by playing a pre-recorded audio message or by playing audio transmitted from the mobile device 204. Optionally, specific recommendations can be made to the user depending one where restlessness is occurring within the pet crate system 900. For example, if the controller 920 determines that restlessness occurs near the front door, the controller 920 can determine (and can transmit such a determination) that the pet wants to be let out for one reason or another. If the controller 920 determines that restlessness occurs in the back of the crate, the controller 920 can determine (and can transmit such a determination) that the pet is anxious or afraid.

The controller 920 can also use signals from one or more of the sensors 922 to determine whether a size of the frame 902 or the housing 903 needs to be adjusted based on restlessness, lack of use, changes in size of the pet (e.g., weight), or other determinations.

Optionally, the controller 920 can use one or more signals or data to determine or predict when events may occur. For example, the controller 920 can determine that a pet has been in the housing 903 for three hours based on the sensors 922 and the controller 920 can receive a signal from the communication network 200 or the controller 120 indicating that the pet consumed 100 ml of water before entering the housing 903. The controller 920 can determine, in consideration of water intake and based on restlessness, that the pet may need to be taken outside and can transmit an alert to the mobile device 204 indicating as much. The controller 920 or the mobile device 204 can also consider the breed of the pet, its age, or its size in making such a determination before producing an alert.

In some examples, restlessness occurring at a specific time each day can be identified and logged by the controller 920 such as to create a trend over time. The data can optionally be used by the controller 920 to determine events that occur near restlessness. Optionally, the controller 920 can operate the diffuser 930 to release a calming pheromone and can operate the speaker 936 to play white noise ahead of an event, which can help calm the pet before the anxiety occurs and may prevent it altogether. Such data and events can be provided to the user in a dashboard on mobile device 204, optionally making note of the improvement in behavior/anxiety.

The controller 920 can also transmit alerts to the mobile device 204 (or the mobile device 204 can produce an alert) based on one or more rules. For example, the user can create a rule to remind (e.g., via an alert) the pet owner to give their pet a break from the crate at specified timer intervals or times of the day.

Any or all of the data collected can be stored or used to produce one or more trends, which can be optionally transmitted (e.g., from the controller 920) to the mobile device 204 where the mobile device 204 can use the data or trends in the form of a digital training coach. The application (e.g., the digital trainer) can make recommendations and observations to help users, such as new pet owners, with behavior training, such as crate training or potty training. The data or trends can be used to offer encouragement to the pet owner. For example, "Your puppy whined an average of 78 minutes per night last week and only 36 minutes per night this week." The mobile device 204 can also be configured to transmit message such as tips and tricks for their pet based on the data we have gathered, such as, "your pet is not drinking enough water", "your pet is resting too much", "your pet is spending too much time locked in the crate", or, "your pet is eating too much."

For example, the controller 920 or the mobile device 204 can also transmit notes of encouragement or reassurance. For example, "we know your dog is whining, but let's wait a few minutes so we hit our Crate goal of 7 minutes." The controller 920 or the mobile device 204 can also produce recommendations to help with pet training such as potty training, crate training, or a feeding schedule. The controller 920 or the mobile device 204 can provide messages or reminders to help maintain a schedule or to help acclimate the pet to the training activity.

Figure 12:
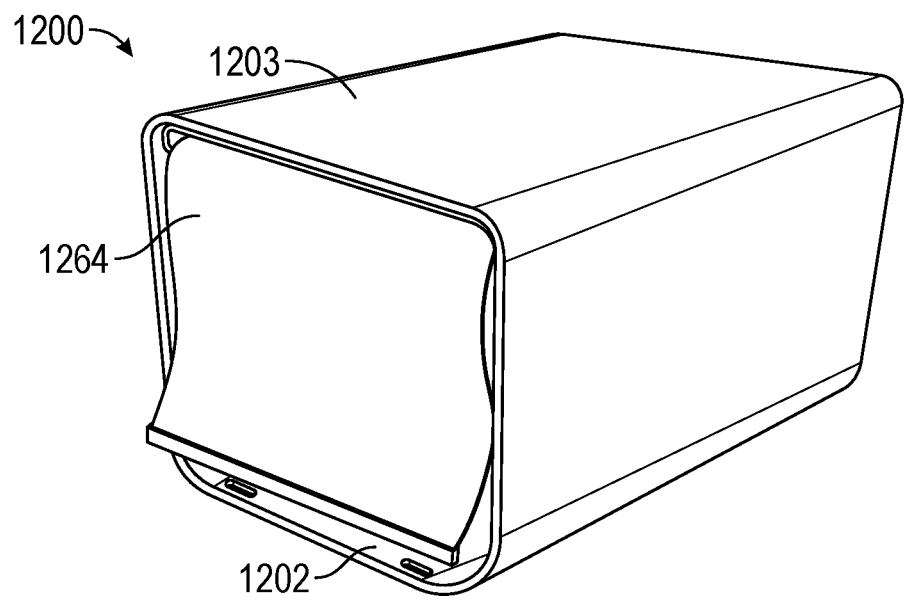
FIG. 12 illustrates a perspective view of a pet bed system.

FIG. 12 illustrates a perspective view of a pet bed system 1200. The pet bed system 1200 can be similar to the pet crate system 900 discussed above. The pet bed system 1200 can differ in that the pet bed system 1200 can include a cover (or front door) 1264, which can be a passive opening cover or a retractable and cover. Optionally, the cover 1264 can be relatively flexible. Any of the systems discussed above or below can be modified to include the features of the pet bed system 1200.

Figure 13:
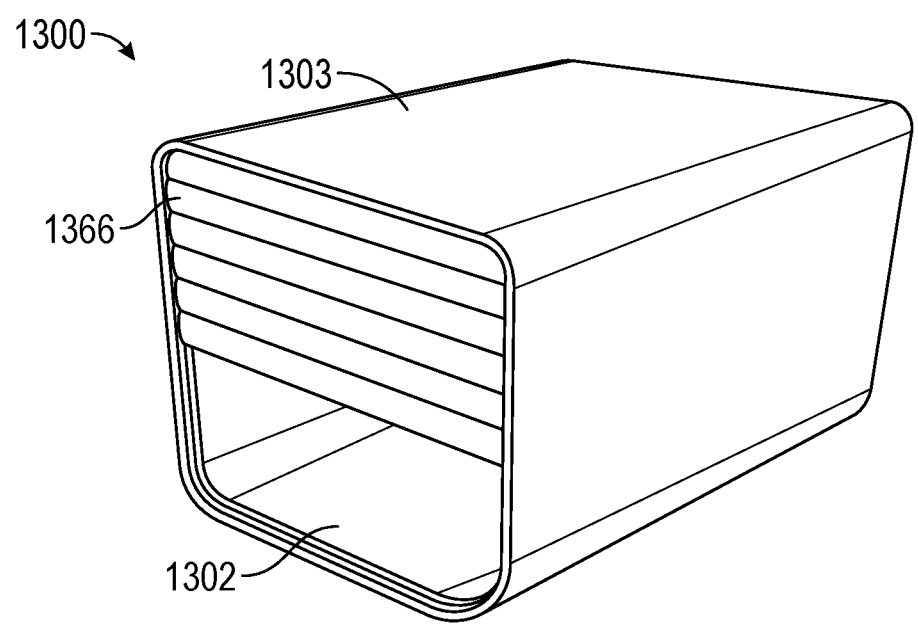
FIG. 13 illustrates a perspective view of a pet bed system.

FIG. 13 illustrates a perspective view of a pet bed system 1300. The pet bed system 1300 can be similar to the pet bed systems discussed above. The pet bed system 1300 can differ in that the pet bed system 1300 can include a door 1366, which can be a retractable door. Optionally, the door 1366 can be connected to an actuator (e.g., an opener) and in communication with a controller (e.g., the controller 920), such that the controller can open and close the 1366 based on one or more sensor signals. Any of the systems discussed above or below can be modified to include the features of the pet bed system 1300.

Figure 14A:
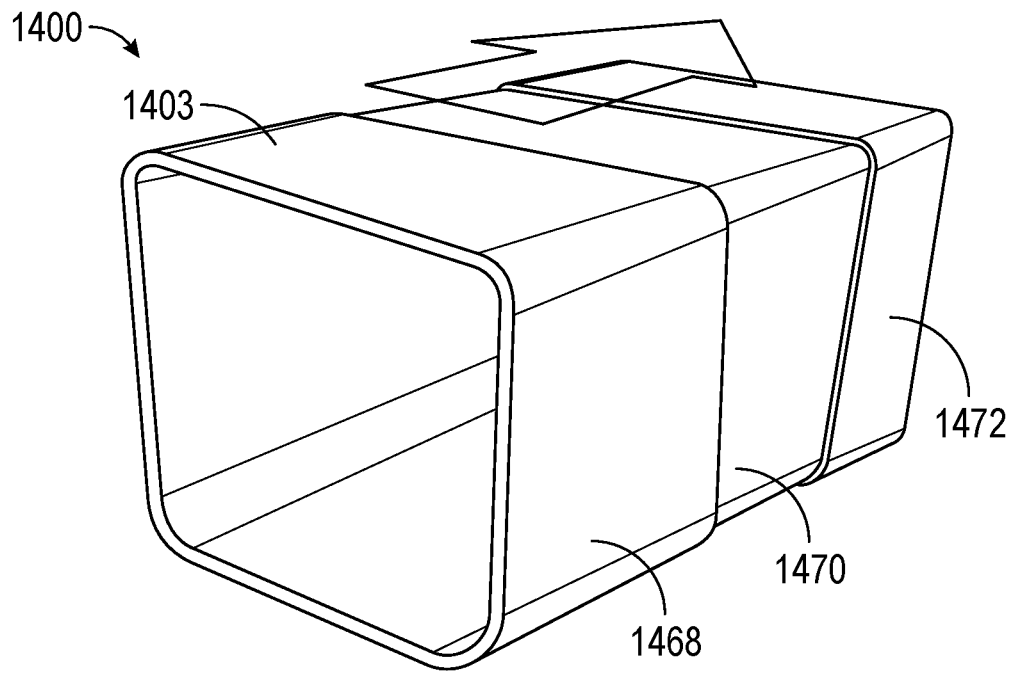
FIG. 14A illustrates a perspective view of a pet bed system in a first condition
Figure 14B:
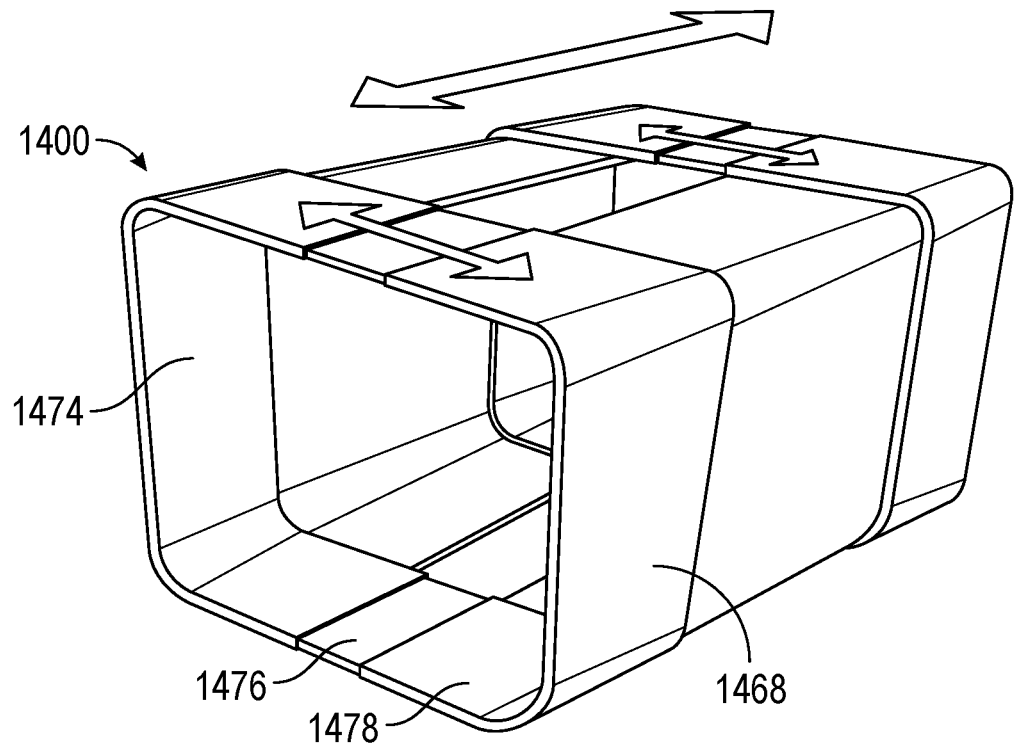
FIG. 14B illustrates a perspective view of a pet bed system in a second condition

FIG. 14A illustrates a perspective view of a pet bed system 1400 in a first condition. FIG. 14B illustrates a perspective view of the pet bed system 1400 in a second condition. The pet bed system 1400 can be similar to the pet bed systems discussed above. The pet bed system 1400 can include a housing 1403 that is adjustable, where the adjustment can be passive, such as requiring user interaction, or can be automated, such as via a controller and one or more actuators. Any of the systems discussed above or below can include the features of the pet bed system 1400.

The 1403 include a front portion 1468, a center portion 1470, and a rear portion 1472. As shown in FIG. 14A, the front portion 1468 and the rear portion 1472 can be movable with respect to each other and with respect to the center portion 1470 to adjust a length of the housing 1403. In this way, the housing 1403 can be adjustable to accommodate pets of different sizes or to accommodate a growing pet. Optionally, open areas created by the panels of the portions or panels moving away from each other can be closed using an extensible material such a fabric, netting, or mesh, or can be closed using one or more interconnected linkages.

As shown in FIG. 14B, the front portion 1468 can include a left portion 1474, a middle portion 1476, and a right portion 1478. As shown in FIG. 14B, the left portion 1474 and right portion 1478 can be movable with respect to each other and with respect to the middle portion 1476 to adjust a width of the housing 1403. The rear portion 1472 can be similarly configured to the front portion 1468 and the length can be adjustable independent of the width. In this way, the housing 1403 can be adjustable to accommodate pets of different sizes or to accommodate a growing pet.

Figure 15:
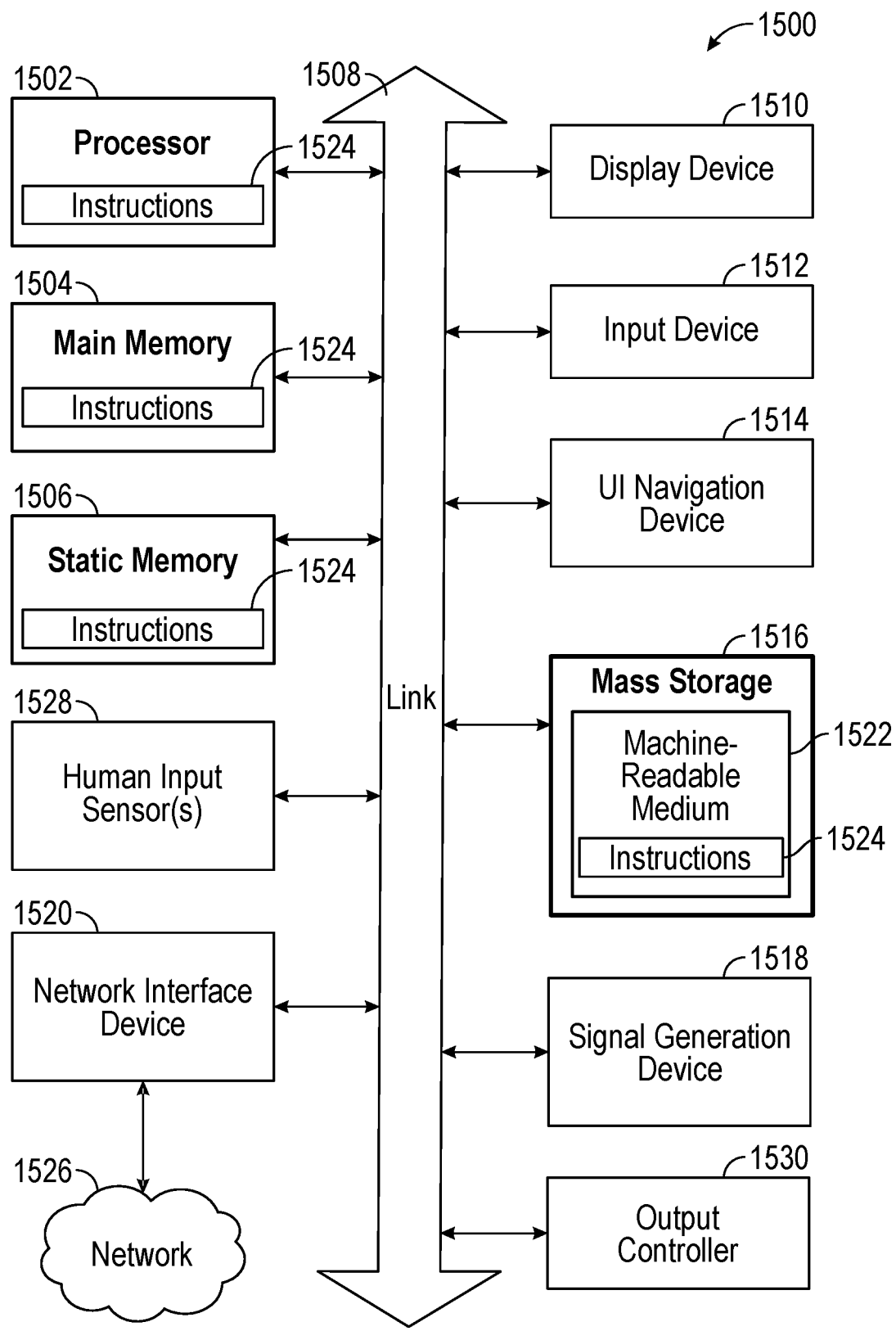
FIG. 15 illustrates a block diagram illustrating an example of a machine upon which one or more embodiments may be implemented.

FIG. 15 illustrates a block diagram of an example machine 1500 upon which any one or more of the techniques (e.g., methodologies) discussed herein may perform. Examples, as described herein, may include, or may operate by, logic or a number of components, or mechanisms in the machine 1500. Circuitry (e.g., processing circuitry) is a collection of circuits implemented in tangible entities of the machine 1500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1500 follow.

In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1500 may include a hardware processor 1502 (e.g., a central processing unit (CPU), a graphics processing unit (GPU), a hardware processor core, or any combination thereof), a main memory 1504, a static memory (e.g., memory or storage for firmware, microcode, a basic-input-output (BIOS), unified extensible firmware interface (UEFI), etc.) 1506, and mass storage 1508 (e.g., hard drive, tape drive, flash storage, or other block devices) some or all of which may communicate with each other via an interlink (e.g., bus) 1530. The machine 1500 may further include a display unit 1510, an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The machine 1500 may additionally include a storage device (e.g., drive unit) 1508, a signal generation device 1518 (e.g., a speaker), a network interface device 1520, and one or more sensors 1516, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1502, the main memory 1504, the static memory 1506, or the mass storage 1508 may be, or include, a machine readable medium 1522 on which is stored one or more sets of data structures or instructions 1524 (e.g., software) embodying or utilized by any one or more of the techniques or functions described herein. The instructions 1524 may also reside, completely or at least partially, within any of registers of the processor 1502, the main memory 1504, the static memory 1506, or the mass storage 1508 during execution thereof by the machine 1500. In an example, one or any combination of the hardware processor 1502, the main memory 1504, the static memory 1506, or the mass storage 1508 may constitute the machine-readable media 1522. While the machine readable medium 1522 is illustrated as a single medium, the term "machine readable medium" may include a single medium or multiple media (e.g., a centralized or distributed database, and/or associated caches and servers) configured to store the one or more instructions 1524.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1524 may be further transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1500, and includes digital or analog communications signals or other intangible medium to facilitate communication of such software. A transmission medium is a machine readable medium.

NOTES AND EXAMPLES

The following, non-limiting examples, detail certain aspects of the present subject matter to solve the challenges and provide the benefits discussed herein, among others.

Example 1 is a pet feeding system comprising: a housing; a food tray connected to the housing; a liquid tray connected to the housing; a food dispenser connected to the housing and configured to dispense food into the food tray; a liquid dispenser connected to the housing and configured to dispense liquid into the liquid tray; a controller communicatively connected to the food dispenser and the liquid dispenser, the controller configured to: operate the food dispenser to dispense the food into the food tray; and operate the liquid dispenser to dispense liquid into the liquid tray.

In Example 2, the subject matter of Example 1 includes, a food sensor connected to the food tray, the food sensor configured to produce a food sensor signal based on a condition of the food tray, the controller configured to operate the food dispenser based on the food sensor signal.

In Example 3, the subject matter of Example 2 includes, a liquid sensor connected to the liquid tray, the liquid sensor configured to produce a liquid sensor signal based on a condition of the liquid tray, the controller configured to operate the liquid dispenser based on the liquid sensor signal.

In Example 4, the subject matter of Example 3 includes, wherein the liquid sensor is a force sensor and wherein the controller is configured to determine a weight of liquid within the liquid tray and dispense liquid based on the determined weight.

In Example 5, the subject matter of Example 4 includes, wherein the food sensor is a force sensor and wherein the controller is configured to determine a weight of food within the food tray and dispense food based on the determined weight.

In Example 6, the subject matter of Examples 2-5 includes, a liquid sensor connected to the liquid tray, the liquid sensor configured to produce a liquid sensor signal based on a condition of the liquid tray, the controller configured to operate the liquid dispenser based on the liquid sensor signal.

In Example 7, the subject matter of Examples 2-6 includes, a supplement dispenser connected to the housing, the controller configured to operate the supplement dispenser, based on the food sensor signal, to dispense a supplement into the food tray.

In Example 8, the subject matter of Examples 1-7 includes, an identification sensor configured to produce an identification signal based on interaction with an identification device associated with a pet, the controller configured to operate one or more of the liquid dispenser and the food dispenser based on the identification signal.

In Example 9, the subject matter of Example 8 includes, a medication dispenser connected to the housing, the controller configured to operate the medication dispenser based on the identification signal.

In Example 10, the subject matter of Examples 8-9 includes, an actuator connected to the food tray and the liquid tray to move the food tray and the liquid tray between a stored position and a deployed position, the controller configured to operate the actuator based on the identification signal.

In Example 11, the subject matter of Example 10 includes, a liquid quality sensor connected to the liquid tray and configured to produce a liquid quality signal based on liquid within the liquid tray, the controller configured to operate the actuator based on the liquid quality signal.

Example 12 is a pet bed system comprising: a cushion; a frame engageable with a floor surface and configured to support the cushion at least partially above the floor surface; a sensor connected to the frame, the sensor configured to produce a sensor signal based on a condition of the cushion and the frame; and a controller communicatively configured to: produce an alert based on the sensor signal.

In Example 13, the subject matter of Example 12 includes, a plurality of load cells connected to the frame, the controller configured to produce an alert based on one or more signals from one or more of the plurality of load cells.

In Example 14, the subject matter of Examples 12-13 includes, an identification sensor connected to the frame and configured to produce an identification signal based on interaction with an identification device connected to a pet, the controller configured to produce the alert based on the sensor signal and the identification signal.

In Example 15, the subject matter of Example 14 includes, an actuator connected to the frame, the controller configured to operate the actuator to move the frame between an expanded position and a contracted position.

In Example 16, the subject matter of Examples 12-15 includes, a crate connected to the frame and configured to at least partially enclose the cushion, the crate including a door movable between an open position and a closed position.

In Example 17, the subject matter of Example 16 includes, an image capture device connected to the crate and configured to produce an image capture signal, the controller configured to identify a pet based on the image capture signal, and the controller configured to move the door based on the identified pet.

In Example 18, the subject matter of Example 17 includes, an actuator connected to the frame and the crate, the controller configured to operate the actuator to move the frame and the crate between an expanded position and a contracted position.

In Example 19, the subject matter of Examples 16-18 includes, wherein the controller is configured to operate the actuator based on the identified pet.

In Example 20, the subject matter of Examples 17-19 includes, a heating or cooling device connected to the crate or the frame and in thermal communication with the cushion, wherein the sensor is a temperature sensor connected to the frame or the crate configured to produce a temperature signal based on a temperature within the crate, and wherein the controller is configured to operate the heating or cooling device based on the temperature signal.

Example 21 is a method of operating a pet feeding system, the method comprising: operating a food dispenser to dispense the food into a food tray of connected to a housing; and operating a liquid dispenser to dispense liquid into a liquid tray connected to the housing.

In Example 22, the subject matter of Example 21 includes, receiving a food sensor signal indicative of a condition of the food tray; and operating the food dispenser based on the food sensor signal.

In Example 23, the subject matter of Example 22 includes, receiving a liquid sensor signal indicative of a condition of the liquid tray; and operating the liquid dispenser based on the liquid sensor signal.

In Example 24, the subject matter of Example 23 includes, determining a weight of liquid within the liquid tray based on the liquid sensor signal; and dispensing liquid based on the determined weight.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

In Example 29, the apparatuses or method of any one or any combination of Examples 1-28 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A pet feeding system comprising:
a housing;
a food tray connected to the housing;
a liquid tray connected to the housing;
a food dispenser connected to the housing and configured to dispense food into the food tray;
a liquid dispenser connected to the housing and configured to dispense liquid into the liquid tray;
a food sensor connected to the food tray, the food sensor configured to produce a food sensor signal based on a condition of the food tray related to a mass in or of the food tray;
an identification sensor configured to produce an identification signal based on interaction with a pet;
a supplement dispenser connected to the housing;
a medication dispenser connected to the housing separate from the supplement dispenser; and
a controller communicatively connected to the food dispenser and the liquid dispenser, the controller configured to:
operate the food dispenser to dispense the food into the food tray;
operate the liquid dispenser to dispense liquid into the liquid tray;
operate the food dispenser based on the food sensor signal;
operate the supplement dispenser, based on the food sensor signal and the identification signal, to dispense a supplement into the food tray; and
operate the medication dispenser, based on the food sensor signal and the identification signal, to dispense a medication into the food tray.

2. The pet feeding system of claim 1, comprising:
a liquid sensor connected to the liquid tray, the liquid sensor configured to produce a liquid sensor signal based on a condition of the liquid tray, the controller configured to operate the liquid dispenser based on the liquid sensor signal.

3. The pet feeding system of claim 2, wherein the liquid sensor is a force sensor and wherein the controller is configured to determine a weight of liquid within the liquid tray and dispense liquid based on the determined weight.

4. The pet feeding system of claim 3, wherein the food sensor is a force sensor and wherein the controller is configured to determine a weight of food within the food tray and dispense food based on the determined weight.

5. The pet feeding system of claim 1, comprising:
a liquid sensor connected to the liquid tray, the liquid sensor configured to produce a liquid sensor signal based on a condition of the liquid tray, the controller configured to operate the liquid dispenser based on the liquid sensor signal.

6. The pet feeding system of claim 1, wherein
the controller is configured to operate one or more of the liquid dispenser and the food dispenser based on the identification signal.

7. The pet feeding system of claim 1, comprising:
an actuator connected to the food tray and the liquid tray to move the food tray and the liquid tray between a stored position and a deployed position, the controller configured to operate the actuator based on the identification signal.

8. The pet feeding system of claim 7, comprising:
a liquid quality sensor connected to the liquid tray and configured to produce a liquid quality signal based on liquid within the liquid tray, the controller configured to operate the actuator based on the liquid quality signal.

* * * * *